United States Patent
Shin et al.

(10) Patent No.: US 10,386,992 B2
(45) Date of Patent: Aug. 20, 2019

(54) DISPLAY DEVICE FOR EXECUTING A PLURALITY OF APPLICATIONS AND METHOD FOR CONTROLLING THE SAME

(71) Applicant: Samsung Electronics Co., Ltd., Suwon-si, Gyeonggi-do (KR)

(72) Inventors: Ki-Hyuck Shin, Hwaseong-si (KR); Sung-Hwan Kim, Suwon-si (KR); Doo-Hwan Kim, Suwon-si (KR); Jae-Yeol Lee, Suwon-si (KR); Kun-Woo Baek, Suwon-si (KR); Hee-Ran Youn, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 219 days.

(21) Appl. No.: 14/096,568

(22) Filed: Dec. 4, 2013

(65) Prior Publication Data

US 2014/0164957 A1 Jun. 12, 2014

Related U.S. Application Data

(60) Provisional application No. 61/734,099, filed on Dec. 6, 2012.

(30) Foreign Application Priority Data

Dec. 31, 2012 (KR) .................. 10-2012-0157934
Aug. 1, 2013 (KR) .................. 10-2013-0091554

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0481* (2013.01); *G06F 3/0487* (2013.01);
(Continued)

(58) Field of Classification Search
CPC ................. G06F 3/04817; G06F 3/0482
(Continued)

(56) References Cited

U.S. PATENT DOCUMENTS 5,515,495 A  5/1996  Ikemoto
6,686,852 B1  2/2004  Guo
(Continued)

FOREIGN PATENT DOCUMENTS

CN  1344989 A  4/2002
CN  1458576 A  11/2003
(Continued)

OTHER PUBLICATIONS

XP055293858 "Windows 7: Grouped Taskbar Icon-Windows Stacked of Side by Side-Windows 7 Help Forums", Nov. 21, 2009, www.sevenforums.com/tutorials/40695-grouped-taskbar-icon-windows-stacked-side-side.html.
(Continued)

*Primary Examiner* — Jennifer N To
*Assistant Examiner* — Terri L Filosi
(74) *Attorney, Agent, or Firm* — Jefferson IP Law, LLP

(57) ABSTRACT

A display device for executing a plurality of applications and a method for controlling the display device are provided. The method includes displaying a plurality of windows in which applications are executed respectively, receiving an iconize input for executing the plurality of windows, checking window information about each of the plurality of windows and discontinuing the displaying of the plurality of windows, and generating a shortcut icon for executing the plurality of windows simultaneously, based on the checked window information.

13 Claims, 30 Drawing Sheets

(51) Int. Cl.
*G06F 3/0481* (2013.01)
*G06F 3/0487* (2013.01)
*H04L 29/06* (2006.01)

(52) U.S. Cl.
CPC ........ *G06F 3/04817* (2013.01); *H04L 65/403* (2013.01); *G06F 2203/04803* (2013.01)

(58) Field of Classification Search
USPC .................................................. 715/779, 753
See application file for complete search history.

(56) References Cited

U.S. PATENT DOCUMENTS

| | | | |
|---|---|---|---|
| 8,271,907 | B2 | 9/2012 | Kim et al. |
| 9,134,891 | B1* | 9/2015 | Schultz ................. G06F 3/0486 |
| 2003/0076362 | A1 | 4/2003 | Terada |
| 2004/0056903 | A1 | 3/2004 | Sakai |
| 2004/0066414 | A1 | 4/2004 | Czerwinski et al. |
| 2005/0044058 | A1 | 2/2005 | Matthews et al. |
| 2005/0235220 | A1 | 10/2005 | Duperrouzel et al. |
| 2006/0123353 | A1* | 6/2006 | Matthews ............. G06F 3/0482 715/779 |
| 2006/0242602 | A1 | 10/2006 | Schechter et al. |
| 2007/0192726 | A1 | 8/2007 | Kim et al. |
| 2008/0172609 | A1 | 7/2008 | Rytivaara |
| 2008/0201664 | A1* | 8/2008 | O ......................... G06Q 10/107 715/835 |
| 2008/0214239 | A1 | 9/2008 | Hashimoto et al. |
| 2008/0320396 | A1 | 12/2008 | Mizrachi et al. |
| 2009/0193364 | A1* | 7/2009 | Jarrett ................. G06F 3/04817 715/838 |
| 2009/0307631 | A1 | 12/2009 | Kim et al. |
| 2009/0322690 | A1 | 12/2009 | Hiltunen et al. |
| 2010/0062811 | A1 | 3/2010 | Park et al. |
| 2010/0088598 | A1 | 4/2010 | Lee et al. |
| 2010/0088634 | A1 | 4/2010 | Tsuruta et al. |
| 2010/0138763 | A1* | 6/2010 | Kim ..................... G06F 1/1626 715/765 |
| 2010/0214278 | A1 | 8/2010 | Miura |
| 2010/0248788 | A1* | 9/2010 | Yook .................... G06F 3/0481 455/566 |
| 2010/0313156 | A1 | 12/2010 | Louch et al. |
| 2011/0138314 | A1 | 6/2011 | Mir et al. |
| 2011/0138328 | A1* | 6/2011 | Ge ........................ G06F 3/0482 715/811 |
| 2011/0167387 | A1 | 7/2011 | Stallings et al. |
| 2011/0173556 | A1 | 7/2011 | Czerwinski et al. |
| 2011/0175930 | A1 | 7/2011 | Hwang et al. |
| 2011/0295830 | A1 | 12/2011 | Swahn |
| 2012/0096396 | A1* | 4/2012 | Ording ................. G06F 9/4443 715/799 |
| 2012/0140255 | A1* | 6/2012 | Tanaka ................. G06F 9/445 358/1.13 |
| 2012/0169768 | A1 | 7/2012 | Roth et al. |
| 2012/0176322 | A1 | 7/2012 | Karmi et al. |
| 2012/0210273 | A1 | 8/2012 | Seong et al. |
| 2012/0227007 | A1 | 9/2012 | Nicholson et al. |
| 2012/0303476 | A1 | 11/2012 | Krzyzanowski et al. |
| 2014/0287724 | A1* | 9/2014 | Takenouchi .......... G06F 3/0482 455/411 |

FOREIGN PATENT DOCUMENTS

| | | | |
|---|---|---|---|
| CN | 101352057 | A | 1/2009 |
| CN | 102073453 | A | 5/2011 |
| CN | 102365617 | A | 2/2012 |
| JP | 05-040590 | * | 2/1993 ............... G06F 3/14 |
| JP | 05-40590 | A | 2/1993 |
| JP | 10-260784 | A | 9/1998 |
| JP | 2000-194474 | A | 7/2000 |
| JP | 2004-046796 | A | 2/2004 |
| JP | 2004-280777 | A | 10/2004 |
| JP | 2006-073015 | A | 3/2006 |
| JP | 2006-115213 | A | 4/2006 |
| JP | 2008-097550 | A | 4/2008 |
| JP | 2008-117181 | A | 5/2008 |
| JP | 2008-134348 | A | 6/2008 |
| KR | 10-0478920 | B1 | 3/2005 |
| KR | 10-0650257 | B1 | 11/2006 |
| KR | 10-0652626 | B1 | 12/2006 |
| KR | 10-0700171 | B1 | 3/2007 |
| KR | 10-2009-0016044 | A | 2/2009 |
| KR | 10-0900295 | B1 | 5/2009 |
| KR | 10-2010-0030968 | A | 3/2010 |
| KR | 10-2010-0053823 | A | 5/2010 |
| KR | 10-2010-0092613 | A | 8/2010 |
| KR | 10-2011-0005136 | A | 1/2011 |
| RU | 2010 135 599 | A | 2/2012 |
| WO | 2008/090902 | A1 | 7/2008 |
| WO | 2009/017175 | A1 | 2/2009 |
| WO | 2009/028892 | A2 | 3/2009 |

OTHER PUBLICATIONS

Andrei Gourianov; "What is a virtual desktop manager? Why do you need virtual desktop manager?"; Jun. 9, 2012; pp. 1-2; https://web.archive.org/web/20120609052235/http://www.goscreen . . . ; XP055438463.

Mark Wilson; "Create virtual desktops with WindowsPager"; Apr. 17, 2012; pp. 1-4; http://windows.appstorm.net/how-to-create-virtual-desktops-with-windowspager/; XP055438464.

Tanashita Takashi; "Mac Fundamental Course, Mac People, Japan, ASCII"; Dec. 3, 2012; pp. 164-167; vol. 19; Media Works Inc.; Japan.

Hirasawa Toshiyasu; "Applications, data and contacts, all are fully protected at once! Suma Whole backup technique, Weekly ASCII"; Dec. 1, 2011; pp. 34-37; vol. 23; Media Works Inc.; Japan.

Australian Government IP Australia; Examination report No. 3 for standard patent application; Nov. 14, 2018; pp. 1-5; Application No. 2013355443; Australia.

Japanese Notice of Allowance with English translation dated Jun. 3, 2019; Japanese Appln. No. 2018-158293.

* cited by examiner

DISPLAY DEVICE FOR EXECUTING A PLURALITY OF APPLICATIONS AND METHOD FOR CONTROLLING THE SAME

CROSS-REFERENCE TO RELATED APPLICATION(S)

This application claims the benefit under 35 U.S.C. § 119(a) of a U.S. patent application filed on Dec. 6, 2012 in the U.S. Patent and Trademark Office and assigned Ser. No. 61/734,099, a Korean patent application filed on Dec. 31, 2012 in the Korean Intellectual Property Office and assigned Serial No. 10-2012-0157934, and a Korean patent application filed on Aug. 1, 2013 in the Korean Intellectual Property Office and assigned Serial No. 10-2013-0091554, the entire disclosure of each of which is hereby incorporated by reference.

TECHNICAL FIELD

The present disclosure relates to a display device that executes a plurality of applications and a method for controlling the display device. More particularly, the present disclosure relates to a display device that controls display of a plurality of windows in which a plurality of applications are executed respectively and a method for controlling the display device.

BACKGROUND

A desktop computer is equipped with at least one display device (e.g., a monitor). A mobile device having a touch screen (e.g., a portable phone, a smart phone, or a tablet Personal Computer (PC)) includes one display device.

A user may work at a desktop computer by dividing the screen of a display device (e.g., by invoking a plurality of windows through horizontal or vertical division of the screen). If a Web browser is executed, the user may move upward or downward on a Web page by means of a page-up button or a page-down button on a keyboard. When the user uses a mouse instead of the keyboard, the user may scroll up or down on the Web page by selecting a scroll bar at a side of the Web page with a mouse cursor. In addition, the user may move to the top of the Web page by selecting a top button displayed as text or an icon at the bottom of the Web page.

Compared to the desktop computer, a mobile device has a small screen and limitations in input. It is difficult to use the mobile device with the screen divided into a plurality of areas.

Various applications may be executed in the mobile device, including basic applications developed and installed in the mobile device by a manufacturer and additional applications downloaded from application sites over the Internet. Ordinary users may develop such additional applications and register them to the application sites. Accordingly, anyone may freely sell developed applications on application sites to mobile device users. At present, free or paid tens of thousands to hundreds of thousands of applications are provided to mobile devices.

Although various applications are provided to mobile devices to stimulate customers' interest and meet their demands as described above, the mobile devices have limitations in terms of display size and User Interfaces (UIs) because the mobile devices are fabricated to portable sizes. As a consequence, mobile device users experience inconvenience in executing a plurality of applications. For example, when an application is executed in a mobile device, an execution screen of the application is displayed in the entirety of a display area on the display of the mobile device. If a user of the mobile device wants to execute another intended application, the user should first end the ongoing application and then select an execution key to execute the intended application. That is, in order to execute a plurality of applications in the mobile device, the user should repeat the execution and ending process for each application, which is quite inconvenient. Moreover, no method for executing a plurality of applications simultaneously in a mobile device has been specified yet.

A plurality of specific applications may be used simultaneously more frequently than other applications. For example, when a user views a video lecture, the user is highly likely to use a video play application and a memo application at the same time. Accordingly, there is a need for a technique that enables simultaneous execution of a video play application and a memo application. Further, there is a need for a technique that changes the sizes or positions of a plurality of windows in which a plurality of applications are executed respectively, as intended by a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display device configured to provide a user-created shortcut icon that enables simultaneous execution of a plurality of applications, and a method for controlling the display device.

In accordance with an aspect of the present disclosure, a method for controlling a display device is provided. The method includes displaying a plurality of windows in which applications are executed respectively, receiving an iconize input for executing the plurality of windows, checking window information about each of the plurality of windows and discontinuing the displaying of the plurality of windows, and generating a shortcut icon for executing the plurality of windows simultaneously, based on the checked window information.

In accordance with another aspect of the present disclosure, a display device is provided. The display includes a touch screen configured to display a plurality of windows in which applications are executed respectively and to receive an iconize input for executing the plurality of windows, a controller configured to check window information about each of the plurality of windows, to control discontinuation of the displaying of the plurality of windows, and to generate a shortcut icon for executing the plurality of windows simultaneously, based on the checked window information, and a memory configured to store window information about each of the plurality of windows.

In accordance with another aspect of the present disclosure, a display device for receiving data from another display device and displaying the received data is provided. The display device includes a touch screen, a communication module configured to receive, from the other display device, window information including information about at least one of types of applications executed in a plurality of windows, positions of the plurality of windows, and sizes of the plurality of windows, a controller configured to control display of a shortcut icon for executing the plurality of windows on the touch screen based on the received window information, and a memory configured to store the received window information.

In accordance with another aspect of the present disclosure, a display device is provided. The display device includes a touch screen configured to display a plurality of windows in which applications are executed respectively and to receive an iconize input for executing the plurality of windows, a memory configured to store a use history of the plurality of windows, and a controller configured to extract iconization information about the plurality of windows from the use history, for generating a shortcut icon that executes the plurality of windows simultaneously and to control generation and display of the shortcut icon based on the extracted iconization information.

In accordance with another aspect of the present disclosure, a method for controlling a display device is provided. The method includes storing a use history of a plurality of windows in which applications are executed respectively, extracting iconization information about the plurality of windows from the use history, for generating a shortcut icon that executes the plurality of windows simultaneously, and generating the shortcut icon based on the extracted iconization information, and displaying the shortcut icon.

In accordance with another aspect of the present disclosure, a method for controlling a display device is provided. The method includes displaying, on a display, a plurality of windows in which applications are executed respectively, receiving a request for generating a shortcut icon that simultaneously executes the plurality of windows, and generating the shortcut icon and displaying the shortcut icon in a predetermined area of the display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While ordinal numbers like first, second, and the like can be used to describe a number of components, such components are not limited by the terms. The terms are used to distinguish one component from other components. For example, a first component may be referred to as a second component or vice versa within the scope and spirit of the present disclosure. The term 'and/or' means inclusion of a combination of a plurality of described associated items or one of the items.

The technical terms used herein are provided simply to describe specific various embodiments, not intended to restrict the present disclosure. Herein, singular expressions include plural expressions unless otherwise clarified in the context. In this description, the term 'include' or 'have' is not interpreted as necessarily including all of the features, numbers, operations, components, parts, or a combination thereof described in the specification. Rather, it should be understood that there are possibilities of omitting or adding one or more features, numbers, operations, components, parts, or combinations thereof.

Unless otherwise defined, all the terms used herein including technical or scientific terms have the same meanings as terms generally understood by those skilled in the art. In addition, terms defined in a general dictionary should be understood so as to have the same meanings as contextual meanings of the related art. Unless definitely defined herein, the terms should not be interpreted as ideal or excessively formal meanings.

Figure 1:
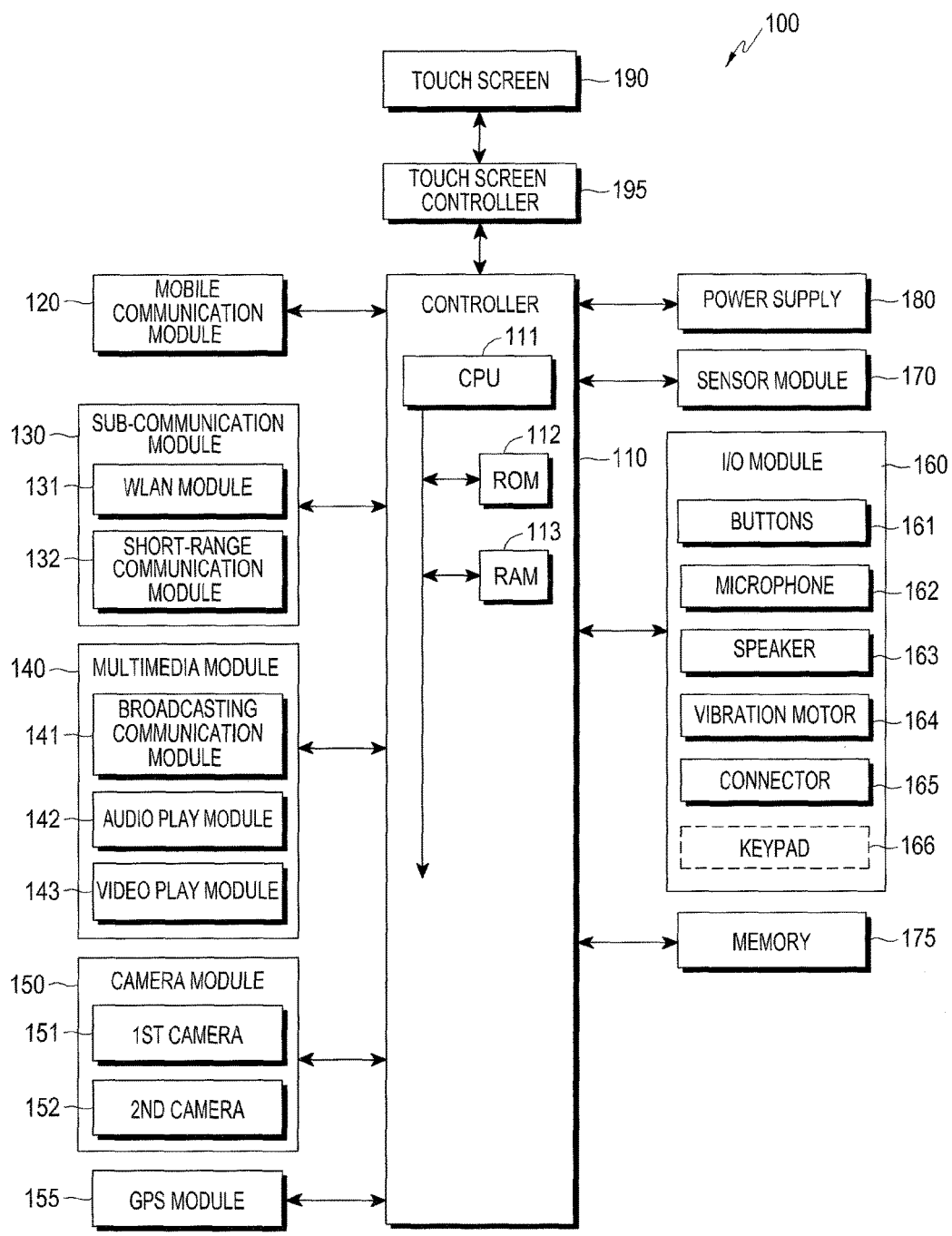
FIG. 1 is a block diagram of a display device according to an embodiment of the present disclosure.

FIG. 1 is a block diagram of a display device according to an embodiment of the present disclosure.

Referring to FIG. 1, a display device 100 may include a controller 110, a mobile communication module 120, a sub-communication module 130, a multimedia module 140, a camera module 150, a Global Positioning System (GPS) module 155, an Input/Output (I/O) module 160, a sensor module 170, a memory 175, a power supply 180, a touch screen 190, a touch screen controller 195, and the like.

The display device 100 may be connected to an external device (not shown) through the mobile communication module 120, the sub-communication module 130, and a connector 165. The external device may be any of another display device (not shown), a portable phone (not shown), a smart phone (not shown), a tablet Personal Computer (PC) (not shown), a server (not shown), and the like.

The sub-communication module 130 includes at least one of a Wireless Local Area Network (WLAN) module 131 and a short-range communication module 132. The multimedia module 140 includes at least one of a broadcasting communication module 141, an audio play module 142, and a video play module 143. The camera module 150 includes at least one of a first camera 151 and a second camera 152. The I/O module 160 includes at least one of buttons 161, a microphone 162, a speaker 163, a vibration motor 164, the connector 165, and a keypad 166.

The controller 110 may include a Central Processing Unit (CPU) 111, a Read Only Memory (ROM) 112 that stores a control program to control the user device 100, and a Random Access Memory (RAM) 113 that stores signals or data received from the outside of the user device 100 or for use as a memory space for an operation performed by the user device 100. The CPU 111 may include one or more cores. The CPU 111, the ROM 112, and the RAM 113 may be connected to one another through an internal bus.

The controller 110 may control the mobile communication module 120, the sub-communication module 130, the multimedia module 140, the camera module 150, the GPS module 155, the I/O module 160, the sensor module 170, the memory 175, the power supply 180, the touch screen 190, and the touch screen controller 195.

The mobile communication module 120 connects the user device 100 to an external device through one or more antennas (not shown) by mobile communication under the control of the controller 110. The mobile communication module 120 transmits wireless signals to or receives wireless signals from a portable phone (not shown), a smart phone (not shown), a tablet PC (not shown), or another display device (not shown) that has a phone number input to the display device 100, for a voice call, a video call, a Short Message Service (SMS), or a Multimedia Messaging Service (MMS).

The sub-communication module 130 may include at least one of the WLAN module 131 and the short-range communication module 132.

The WLAN module 131 may be connected to the Internet under the control of the controller 110 in a place in which a wireless AP (not shown) is installed. The WLAN module 131 supports a WLAN standard, e.g., Institute of Electrical and Electronics Engineers (IEEE) 802.11x. The short-range communication module 132 may conduct short-range wireless communication between the user device 100 and another device such as, for example, an image forming device (not shown) under the control of the controller 110. The short-range communication may conform to Bluetooth, Infrared Data Association (IrDA), and the like.

The display device 100 may include at least one of the mobile communication module 120, the WLAN module 131, and the short-range communication module 132 according to the capabilities of the display device 100. For example, the display device 100 may include a combination of the mobile communication module 120, the WLAN module 131, and the short-range communication module 132 according to the capabilities of the display device 100.

The multimedia module 140 may include the broadcasting communication module 141, the audio play module 142, and/or the video play module 143. The broadcasting communication module 141 may receive a broadcast signal (e.g., a TV broadcast signal, a radio broadcast signal, a data broadcast signal, and/or the like) and additional broadcasting information (e.g., an Electronic Program Guide (EPG), Electronic Service Guide (ESG), and/or the like) from a broadcasting station through a broadcasting communication antenna (not shown) under the control of the controller 110. The audio play module 142 may open a stored or received digital audio file (e.g., a file having such an extension as mp3, wma, ogg, way, or the like) under the control of the controller 110. The video play module 143 may open a stored or received digital video file (e.g., a file having an extension such as mpeg, mpg, mp4, avi, mov, mkv, or the like) under the control of the controller 110. The video play module 143 may also open a digital audio file.

The multimedia module 140 may include the audio play module 142 and the video play module 143 without the broadcasting communication module 141. Alternatively, the audio play module 142 or the video play module 143 of the multimedia module 140 may be incorporated into the controller 110.

The camera module 150 may include at least one of the first camera 151 and the second camera 152, to capture a still image or a video under the control of the controller 110. The first camera 151 or the second camera 152 may include an auxiliary light source (e.g., a flash (not shown)) to provide a light intensity required for capturing an image. The first camera 151 may be disposed on the front surface of the display device 100, while the second camera 152 may be disposed on the rear surface of the device 100. Alternatively, the first camera 151 and the second camera 152 may be arranged near to each other (e.g., the distance between the first camera 151 and the second camera 152 may be between 1 cm and 8 cm) in order to capture a three-dimensional still image or video.

The GPS module 155 may receive signals from a plurality of GPS satellites (not shown) in Earth orbit and calculate a position of the display device 100 based on the Time of Arrivals (ToAs) of satellite signals from the GPS satellites to the display device 100.

The I/O module 160 may include at least one of the plurality of buttons 161, the microphone 162, the speaker 163, the vibration motor 164, the connector 165, and the keypad 166.

The buttons 161 may be formed on the front surface, a side surface, or the rear surface of a housing of the display device 100, and may include at least one of a power/lock button, a volume button, a menu button, a home button, a back button, and a search button.

The microphone 162 receives a voice or a sound and converts the received voice or sound to an electrical signal under the control of the controller 110.

The speaker 163 may output sounds corresponding to various signals (e.g., a wireless signal, a broadcast signal, a digital audio file, a digital video file, a photo shot, and the like) received from the mobile communication module 120, the sub-communication module 130, the multimedia module 140, and the camera module 150 to the outside of the display device 100. The speaker 163 may output sounds corresponding to functions (e.g., a button manipulation sound, a ringback tone for a call, and the like) performed by the display device 100. One or more speakers 163 may be disposed at an appropriate position or positions of the housing of the display device 100.

The vibration motor 164 may convert an electrical signal to a mechanical vibration under the control of the controller 110. For example, when the display device 100 receives an incoming voice call from another device (not shown) in a vibration mode, the vibration motor 164 operates. One or more vibration motors 164 may be mounted inside the housing of the display device 100. The vibration motor 164 may operate in response to a user's touch on the touch screen 190 and a continuous movement of the touch on the touch screen 190.

The connector 165 may be used as an interface to connect the display device 100 to an external device (not shown) and/or a power source (not shown). The connector 165 may transmit data stored in the memory 175 to the external device via a cable connected to the connector 165 or may receive data from the external device via the cable, under the control of the controller 110. The display device 100 may receive power or charge a battery (not shown) from the power source via the cable connected to the connector 165.

The keypad 166 may receive a key input from the user to control the display device 100. The keypad 166 includes a physical keypad (not shown) formed in the display device 100 or a virtual keypad (not shown) displayed on the touch screen 190. The physical keypad may not be provided according to the capabilities or configuration of the display device 100.

The sensor module 170 includes at least one sensor (not shown) to detect a state of the display device 100. For example, the sensor module 170 may include a proximity sensor that detects whether the user is close to the display device 100, a luminance sensor that detects the amount of ambient light around the display device 100, a motion sensor that may detect a motion of the display device 100 (e.g., rotation, acceleration, vibration of the display device 100, and/or the like), and/or the like. At least one sensor may detect a state of the display device 100, generate a signal corresponding to the detected state, and transmit the generated signal to the controller 110. A sensor may be added to or removed from the sensor module 170 according to the capabilities of the display device 100.

The memory 175 may store input/output signals or data in accordance with operations of the mobile communication module 120, the sub-communication module 130, the multimedia module 140, the camera module 150, the GPS module 155, the I/O module 160, the sensor module 170, and the touch screen 190 under the control of the controller 110. The memory 175 may store a control program to control the display device 100 or the controller 110, and applications.

The term "memory" corresponds to the memory 175, the ROM 112 and the RAM 113 within the controller 110, or a memory card (not shown) (e.g., a Secure Digital (SD) card, a memory stick, and/or the like) mounted to the display device 100. The memory may include a non-volatile memory, a volatile memory, a Hard Disk Drive (HDD), or a Solid State Drive (SSD).

The power supply 180 may supply power to one or more batteries (not shown) mounted in the housing of the display device 100 under the control of the controller 110. The one or more batteries supply power to the display device 100. Further, the power supply 180 may supply power received from an external power source (not shown) via the cable connected to the connector 165 to the display device 100.

The touch screen 190 may provide User Interfaces (UIs) corresponding to various services (e.g., call, data transmission, broadcasting, photography, and/or the like) to the user. The touch screen 190 may transmit an analog signal corresponding to at least one touch on a UI to the touch screen controller 195. The touch screen 190 may receive at least one touch input through a user's body part (e.g., a finger, and/or the like) or a touch input tool (e.g., a stylus pen, and/or the like). The touch screen 190 may also receive a touch input signal corresponding to a continuous movement of a touch among one or more touches. The touch screen 190 may transmit an analog signal corresponding to the continuous movement of the input touch to the touch screen controller 195.

As used in this description, 'touch' may include a non-contact touch (e.g., the detectable gap between the touch screen 190 and the user's body part or the touch input tool is 1 mm or less), and need not be limited to contacts between the touch screen 190 and the user's body part or the touch input tool. A gap detectable to the touch screen 190 may vary according to the capabilities or configuration of the display device 100.

The touch screen 190 may be implemented as, for example, a resistive type, a capacitive type, an infrared type, an acoustic wave type, or the like.

The touch screen controller 195 converts an analog signal received from the touch screen 190 to a digital signal (e.g., X and Y coordinates). The controller 110 may control the touch screen 190 using the digital signal received from the touch screen controller 195. For example, the controller 110 may control selection or execution of a shortcut icon (not shown) displayed on the touch screen 190 in response to a touch. The touch screen controller 195 may be incorporated into the controller 110.

Figure 2A:
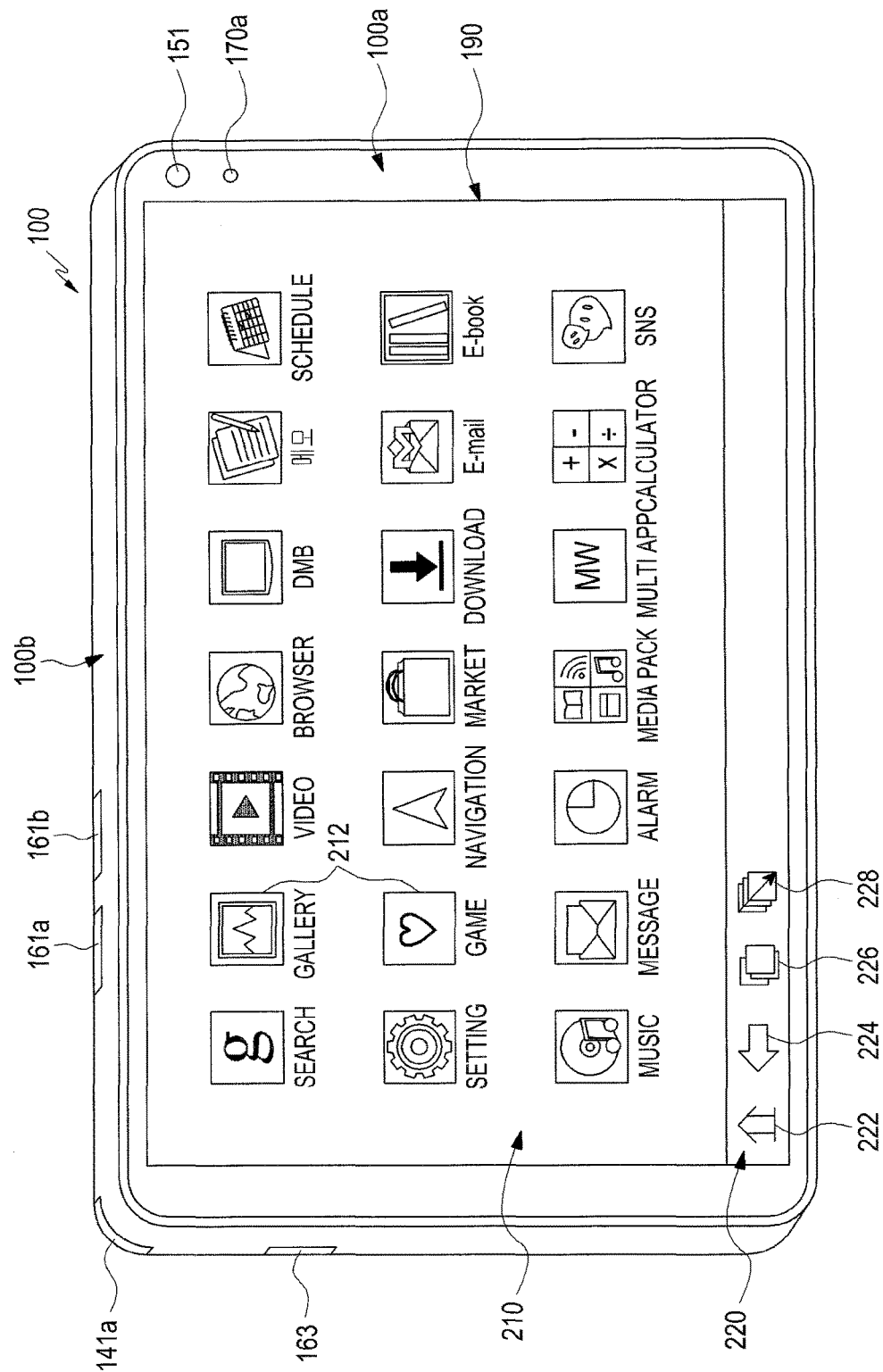
FIG. 2A is a perspective view of a display device according to an embodiment of the present disclosure.

FIG. 2A is a perspective view of a display device according to an embodiment of the present disclosure.

Referring to FIG. 2A, the touch screen 190 is disposed at the center of the front surface 100a of the display device 100, occupying almost the entirety of the front surface 100a. The first camera 151 and a luminance sensor 170a may be disposed along an edge of the front surface 100a of the display device 100. For example, a power/reset button 161a, a volume button 161b, the speaker 163, a terrestrial DMB antenna 141a for broadcasting reception, a microphone (not shown), a connector (not shown), and the like may be disposed on side surfaces 100b of the display device 100, and a second camera (not shown) may be disposed on the rear surface (not shown) of the display device 100.

A main screen 210 and a bottom bar 220 are displayed on the touch screen 190. In FIG. 2A, the display device 100 and the touch screen 190 are positioned in landscape mode (i.e., the display device 100 and the touch screen 190 are positioned so that their horizontal lengths are larger than their vertical lengths). In this case, the touch screen 190 is determined to be disposed horizontally.

One or more applications are executed in the main screen 210. In FIG. 2A, a home screen is displayed on the touch screen 190, by way of example. The home screen is the first screen to be displayed on the touch screen 190, when the display device 100 is powered on. Execution keys 212 used to execute a plurality of applications stored in the display device 100 are displayed in rows and columns on the home screen. The execution keys 212 may include icons, buttons, and/or text. Upon touching of an execution key, an application corresponding to the execution key is executed and displayed on the main screen 210.

The bottom bar 220 is elongated along a horizontal direction at the bottom of the touch screen 190 and includes standard function buttons 222, 224, 226, and 228. The home button 222 displays the home screen on the main screen 210. For example, upon touching of the home button 222 during execution of applications on the main screen 210, the home screen illustrated in FIG. 2A is displayed on the main screen 210. The back button 224 displays the screen previous to a current screen or ends the latest used application. The multi-view mode button 226 displays applications on the main screen 210 in a multi-view mode according to the present disclosure. The mode switch button 228 is used to display a plurality of applications that are being executed on the main screen 210 in a switched mode. For example, upon touching of the mode switch button 228, a plurality of applications may be switched between a free style mode and a split mode. The plurality of applications are freely displayed at the same positions, partially overlapped with one another in the free style mode, whereas the plurality of applications are displayed separately in different areas of the main screen 210 in the split mode.

A top bar (not shown) may be formed at the top of the touch screen 190 in order to display states of the display device 100 including a battery charges state, a received signal strength, and a current time.

The bottom bar 220 and the top bar (not shown) may not be displayed on the touch screen 190 according to an Operating System (OS) of the display device 100 or an application executed in the display device 100. If none of the bottom bar 220 and the top bar are displayed on the touch screen 190, the main screen 210 may be displayed in the entirety of the touch screen 190. Or the bottom bar 220 and the top bar may be displayed semi-transparently on the main screen 210.

Figure 2B:
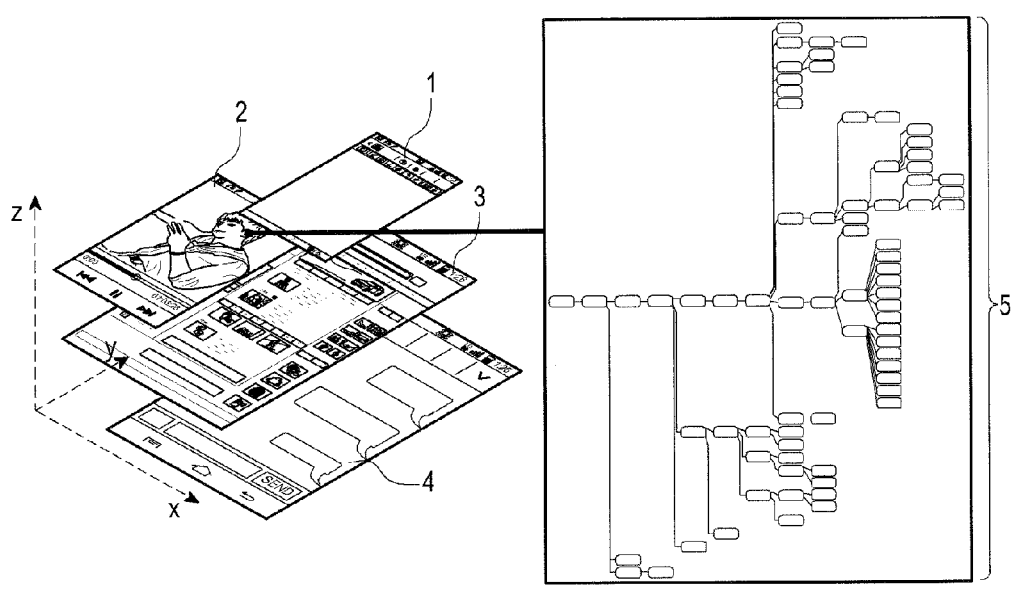
FIG. 2B illustrates the concept of Z-order according to an embodiment of the present disclosure.

FIG. 2B illustrates the concept of Z-order according to an embodiment of the present disclosure.

Referring to FIG. 2B, if the Z-order of a screen is divided into N layers, an Nth layer may lie on an (N-1)th layer. A window corresponding to each layer may exist at the layer and an application may be executed in the window. That is, upon execution of a first application, the first application is executed in a first-layer window. Then upon execution of a second application, the second application is executed in a second-layer window, and upon execution of a third application, the third application is executed in a third-layer window. Thus, first, second, and third layers are generated hierarchically. The last generated layer may exist at the top layer and thus may be displayed on top of the screen. For example, a plurality of windows 1, 2, 3, and 4 may be displayed overlapped with one another on the main screen 210. More specifically, the first window 1 is displayed overlapped over the second, third, and fourth windows 2, 3, and 4. The second window 2 is displayed overlapped over the third and fourth windows 3, and 4, and the third window 3 is displayed overlapped over the fourth window 4. When the plurality of windows 1, 2, 3, and 4 are overlapped, the ordering of displaying the plurality of windows 1, 2, 3, and 4 is referred to as a Z-order. The Z-order may be the display ordering of windows along a Z axis. A hierarchical viewer 5 provides a view of hierarchical Z-orders. The Z-order may be referred to as a display order.

Figure 3A:
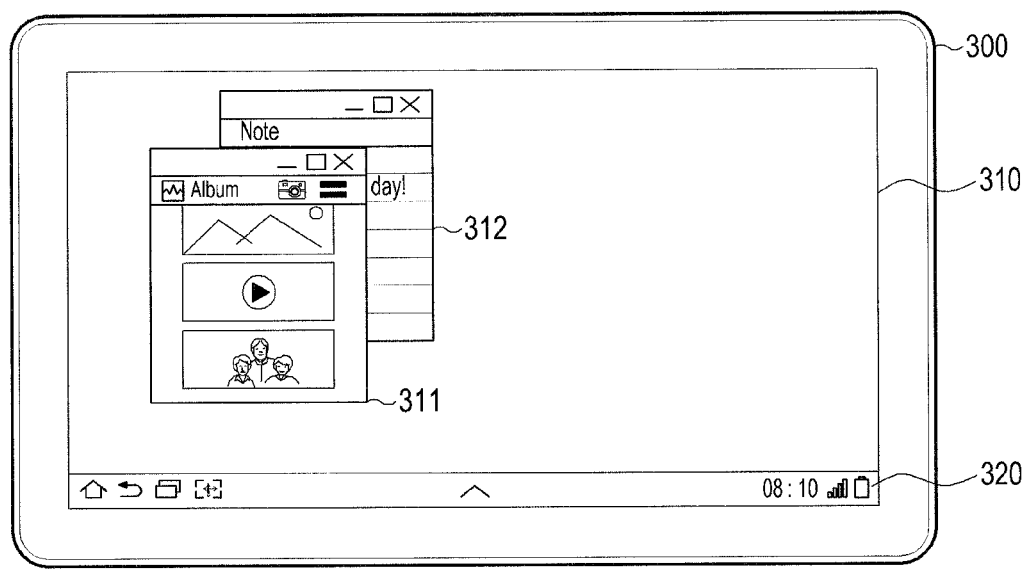
FIG. 3A illustrates a screen displaying windows according to an embodiment of the present disclosure.

FIG. 3A illustrates a screen displaying windows according to an embodiment of the present disclosure. Specifically, FIG. 3A illustrates the concept of a free style mode.

Referring to FIG. 3A, a display device 300 includes a touch screen 310. A plurality of windows 311 and 312 are displayed on the touch screen 310. Further, a bottom bar 320 is displayed at the bottom of the touch screen 310. As described before, a display mode in which the plurality of windows 311 and 312 are displayed overlapped with each other according to their display priority levels may be referred to as a free style mode.

A window may be defined as an area that covers an execution screen of a specific application, and a title bar and a control area that are configured for the executed application. Objects related to the application may be displayed on the execution screen of the application. The objects may have various shapes such as text, a figure, an icon, a button, a check box, a photo, a video, a Web, a map, and the like. When a user touches an object, a predetermined function or event corresponding to the object may be executed in the application. The object may be referred to as a view according to an OS. The title bar may include at least one control key that controls display of the window. For example, the at least one control key may include a minimize button, a maximize button, and an end button.

Applications are programs configured independently by a manufacturer of the display device 300 or an application developer. Therefore, execution of one application does not require pre-execution of another application. In addition, even though one application ends, another application may continue.

Compared to an application which is an independently configured program, a composite function application (or a dual application) has a part (e.g., a memory function, a message transmission and reception function, etc.) of the functions of another application in addition to one application (e.g., a video application). Such a composite function application differs from the above independent applications in that it is a single application newly configured to include specific functions. Accordingly, the composite function application provides only limited functions, while various functions are available from existing independent applications. If a user needs a new composite function application, the user should purchase the composite function application.

The controller 110 controls partially overlapped display of the plurality of windows 311 and 322. The controller 110 may prioritize the plurality of windows 311 and 312 regarding their display. For example, the controller 110 may assign priority to the window 311 over the window 312. Thus the controller 110 displays the window 311 with a relatively high priority level over the window 312 with a relatively low priority level. A part of the window 312 hidden by the window 311 is not displayed on the screen.

The controller 110 may assign the highest display priority level to a window for which the latest control event has been input. For example, when the user touches the window 311, the controller 110 assigns the highest display priority level to the window 311.

Figure 3B:
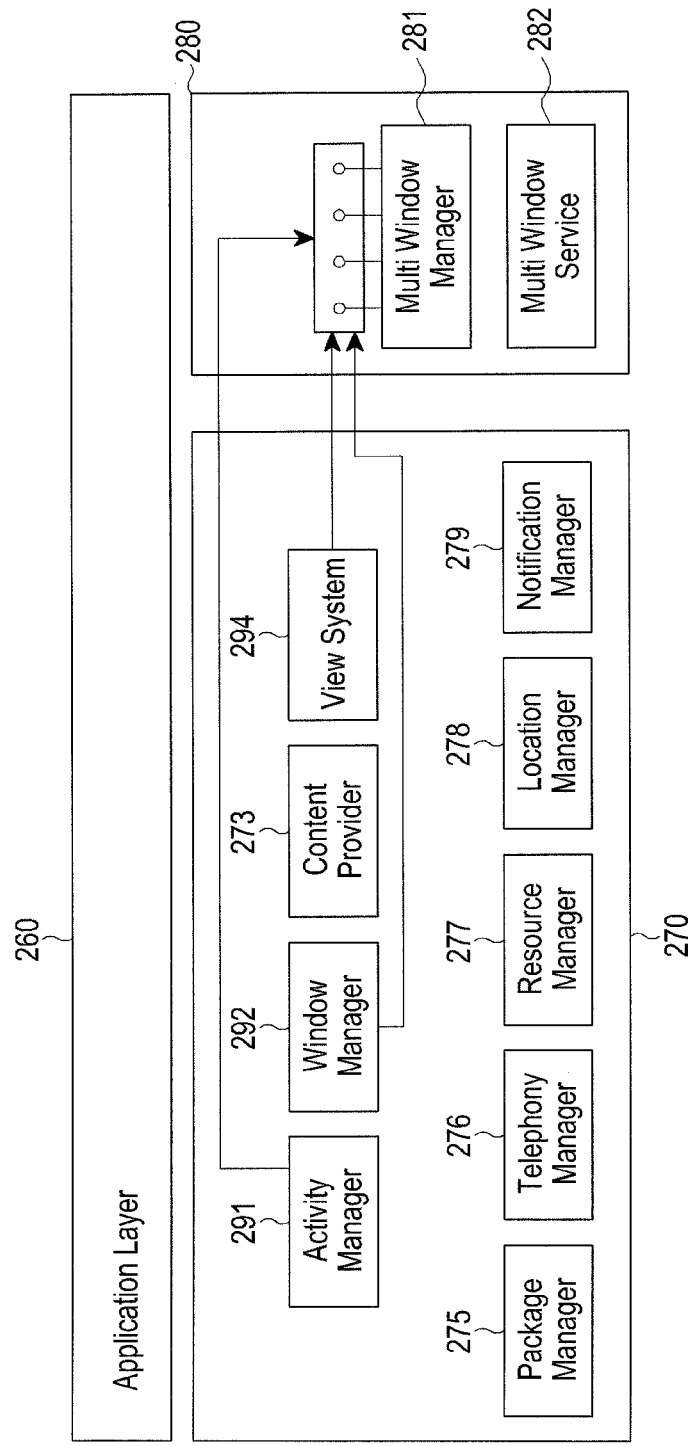
FIG. 3B illustrates the concept of a framework according to an embodiment of the present disclosure.

FIG. 3B illustrates the concept of a framework according to an embodiment of the present disclosure.

Referring to FIG. 3B, an activity manager 291, a window manager 292, and a view system 294 of a framework 270 may be compatible with a multi-window framework 280. The compatibility with the multi-window framework 280 may be invoking an Application Program Interface (API) or the like. The framework 270 may also include a Content Provider 273, a Package Manager 275, a Telephony Manager 276, a Resource Manager 277, a Location Manager 278, and a Notification Manager 279.

The multi-window framework 280 includes a multi-window manager 281 and a multi-window service 282.

The activity manager 291, the window manager 292, and the view system 294 may invoke a multi-window API. The window manager 292 may generate a title bar for each window. Further, the window manager 292 may detect the Z-order of each window and determine the ordering of windows based on the Z-orders of the windows.

The multi-window manager 281 provides the functionality of the multi-window service 282 in the form of an API to a user and the Manager/Service structure may operate based on InterProcess Communication (IPC).

The multi-window service 282 tracks the life cycles of applications executed in multiple windows and manages states of each application such as the size and position of the application.

An invoked API may manage the size, position, and visibility of each window.

As described above, the framework according to the present disclosure may be operated in a way of providing an independent multi window framework to invoke the API.

An application layer 260 may invoke an API directly from the multi-window manager 281. That is, when the user develops a new application, the user may also use an API provided by the multi-window manager 281.

As described above, the multi-window framework 280 may be used and two or more applications may be displayed simultaneously according to the present disclosure.

Figure 3C:
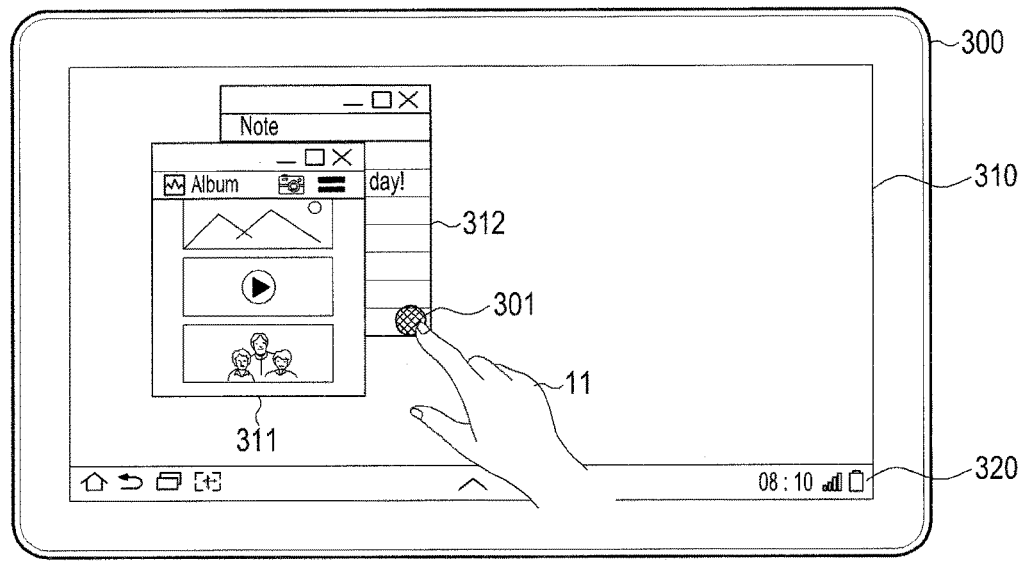
FIG. 3C illustrates a screen referred to for describing an operation of changing the display order of windows according to an embodiment of the present disclosure.

FIG. 3C illustrates a screen referred to for describing an operation of changing the display order of windows according to an embodiment of the present disclosure.

Referring to FIG. 3C, when a user 11 touches 301 the window 312 on the touch screen 310 of the display device 300, the controller 110 assigns a highest display priority level to the window 312 for which the latest control event has been input. Further, the controller 110 decreases the priority level of the window 311 from the highest priority level to the second-highest priority level. That is, the controller 110 decreases the display priority level of the window 311 by one level. A bottom bar 320 may be displayed at the bottom of the touch screen 310.

Figure 3D:
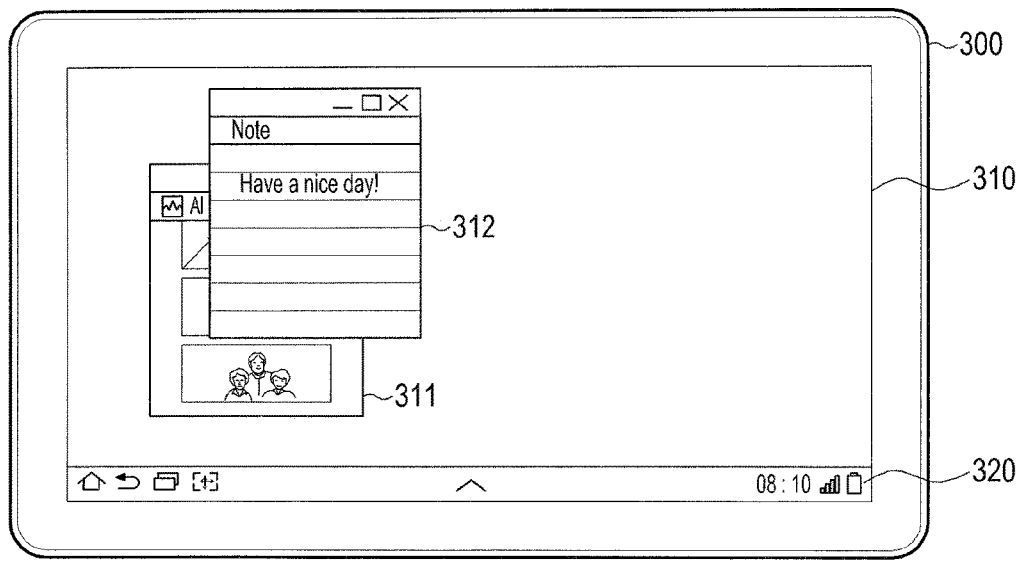
FIG. 3D illustrates a screen displaying windows in a changed display order according to an embodiment of the present disclosure.

FIG. 3D illustrates a screen displaying windows in a changed display order according to an embodiment of the present disclosure.

Referring to FIG. 3D, the window 312 having the highest priority level may be displayed overlapped over the window 311. A part of the window 311 having a relatively low priority level hidden by the window 312 having a relatively high priority level is not displayed on the touch screen 310 of the display device 300. A bottom bar 320 may be displayed at the bottom of the touch screen 310.

Figure 4A:
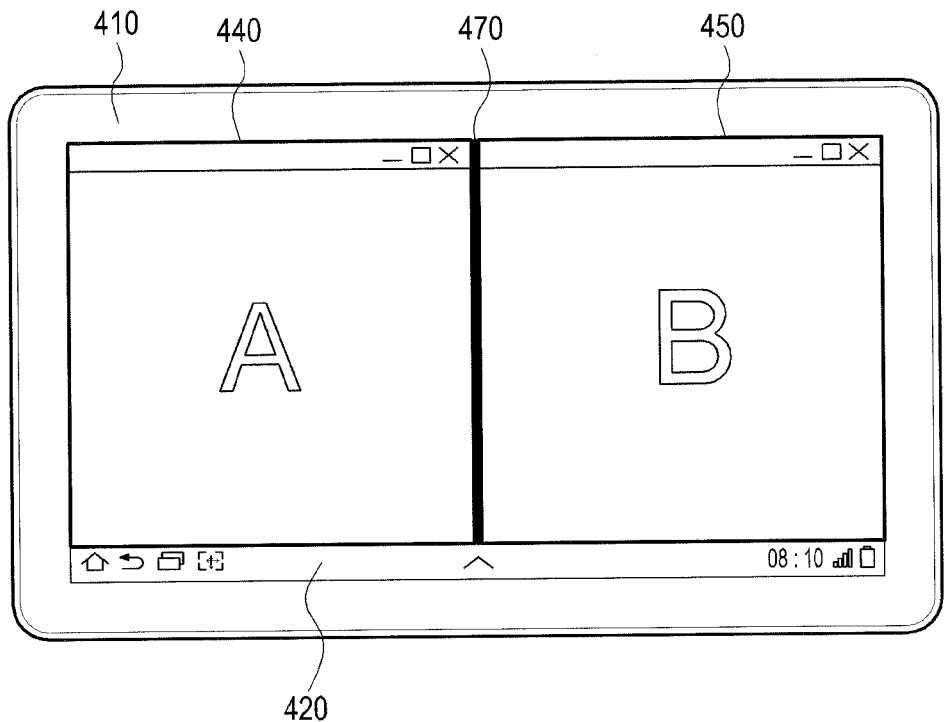
FIGS. 4A and 4B illustrate a split mode in a display device according to an embodiment of the present disclosure.
Figure 4B:
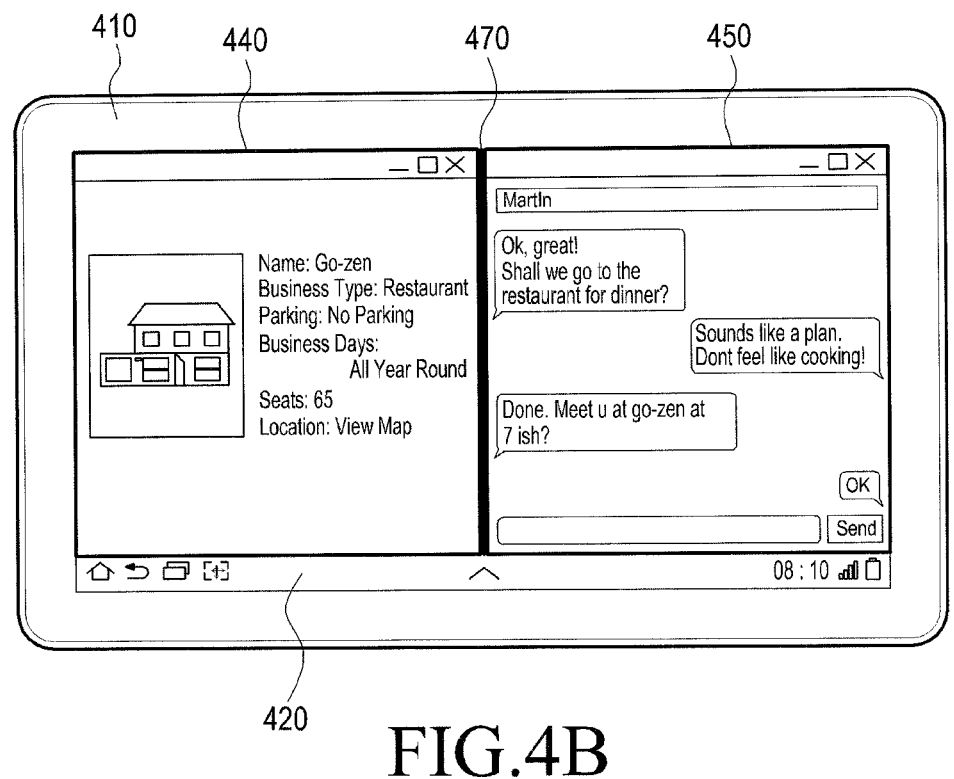

FIGS. 4A and 4B illustrate a split mode in a display device according to an embodiment of the present disclosure.

FIG. 4A illustrates an example of displaying two applications on a main screen 410 in the split mode. When a user executes a plurality of applications, a controller (not shown) may execute the plurality of applications simultaneously and display the applications on the main screen 410 in the split mode.

In the split mode, a first window 440 and a second window 450 may be displayed without overlap on the main screen 410. For example, as illustrated in FIG. 4A, the main screen 410 may be divided into two halves, and the first window 440 and the second window 450 may be displayed, respectively in the left half and right half of the main screen 410. Although the first and second windows 440 and 450 are near to each other, sharing a common boundary line 470, the first and second windows 440 and 450 are not overlapped with each other. The common boundary line 470 is drawn between the first and second windows 440 and 450. A bottom bar 420 may be displayed at the bottom of the main screen 410.

FIG. 4B illustrates an exemplary split-mode operation. Referring to FIG. 4B, while a user is searching for a desired restaurant by a Web browser application executed in the first window 440, the user may simultaneously make an appointment for dinner with a friend by a message application executed in the second window 450. As illustrated in FIG. 4B, the user may search for information in the Internet by touching an object in the first window 440. In addition, the user may talk with a friend, Martin through a message service by touching an object in the second window 450. Although the first and second windows 440 and 450 are near to each other, sharing a common boundary line 470, the first and second windows 440 and 450 are not overlapped with each other. The common boundary line 470 is drawn between the first and second windows 440 and 450. A bottom bar 420 may be displayed at the bottom of the main screen 410.

Figure 5A:
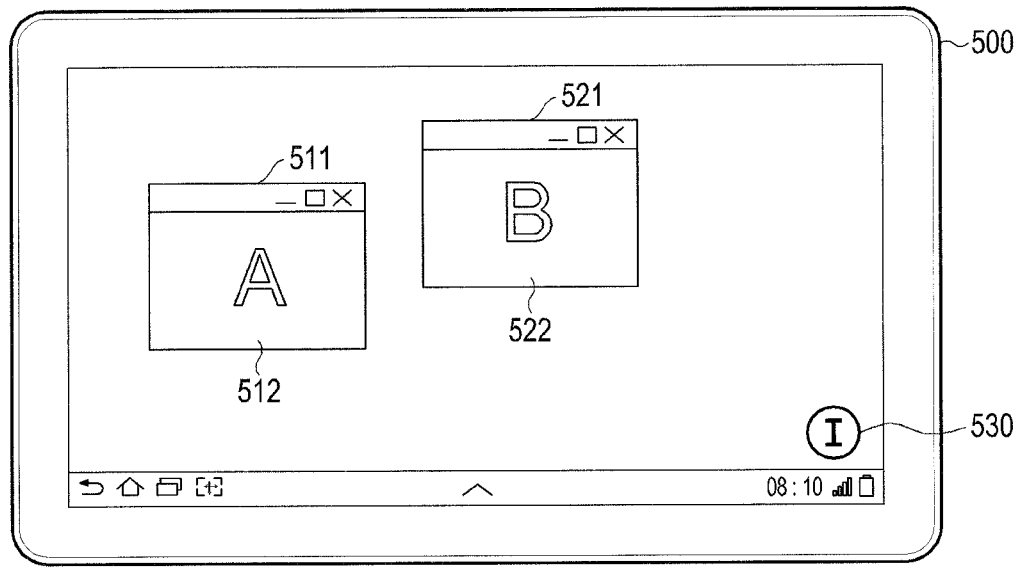
FIGS. 5A, 5B, and 5C illustrate an operation of a display device according to an embodiment of the present disclosure.
Figure 5B:
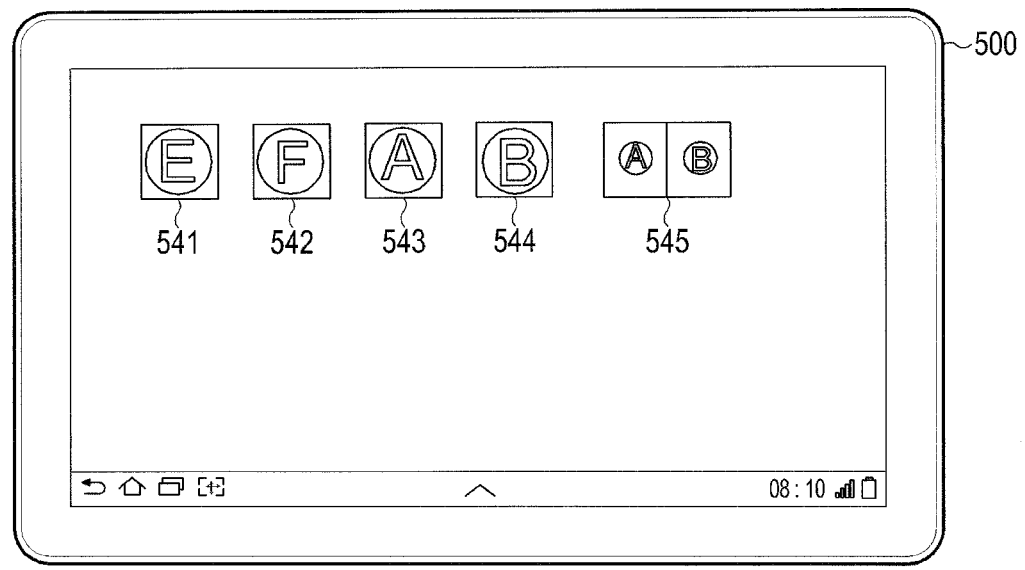
Figure 5C:
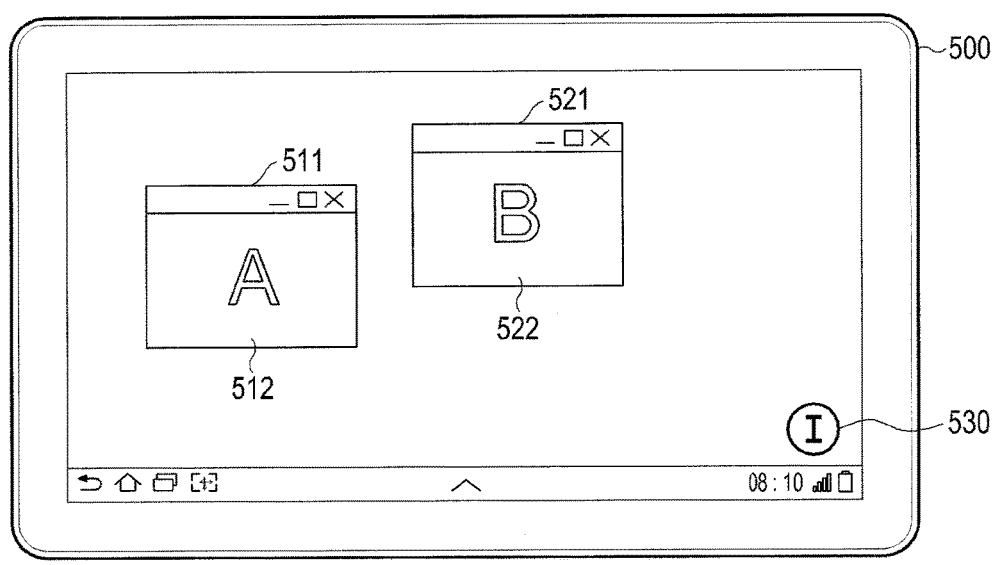

FIGS. 5A, 5B, and 5C illustrate an operation of a display device according to an embodiment of the present disclosure.

Referring to FIG. 5A, a display device 500 may display a first window 511 and 512 and a second window 521 and 522 on a touch screen. The first window 511 and 512 may include a first title bar 511 and an execution window 512 of a first application. The second window 521 and 522 may include a second title bar 521 and an execution window 522 of a second application. The display device 500 may further display an iconize button 530.

Upon selection of the iconize button 530, a controller (not shown) checks window information about each of the first window 511 and 512 and the second window 521 and 522. More specifically, the controller may determine at least one of the type of the first application executed in the first window 511 and 512, the size of the first window 511 and 512, and the display position of the first window 511 and 512. The controller may determine at least one of the type of the second application executed in the second window 521 and 522, the size of the second window 521 and 522, and the display position of the second window 521 and 522. For example, a multi-window manager may invoke an API from a task manager and a window manager of a framework and check window information about each window. The window information about each window may further include information about an execution state of an application executed in the window.

The controller may check the window information about the first window 511 and 512 and the second window 521 and 522 and may discontinue displaying the first window 511 and 512 and the second window 521 and 522. In addition, the controller may generate a shortcut icon that enables simultaneous execution of the first application in the first window 511 and 512 and the second application in the second window 521 and 522. The controller may provide a UI through which the shortcut icon may be named by a preset template or directly by a user. The controller may receive the name of the shortcut icon from the user and may control display of the shortcut icon together with the received name.

For application of an iconize input, selection of an iconize button on a touch screen is purely exemplary and those skilled in the art will readily understand that an iconize input may be applied in a different manner. For example, an iconize input may be applied by long pressing (e.g., equal or greater than a threshold amount of time) a screen capture icon. The position of the iconize button is also exemplary. Thus the iconize button may be disposed in a bottom bar or the like.

FIG. 5B illustrates a menu screen displaying a shortcut icon according to an embodiment of the present disclosure. Referring to FIG. 5B, the controller controls display of a shortcut icon 545 along with application execution icons 541, 542, 543, and 544. The shortcut icon 545 may be, for example, a composite image including a thumbnail image of the first application and a thumbnail image of the second application.

The user may select the shortcut icon 545 to execute the first and second applications simultaneously. When the controller determines that the shortcut icon 545 has been selected, the controller may read the window information about the first window 511 and 512 and the window information about the second window 521 and 522.

FIG. 5C illustrates a display device according to an embodiment of the present disclosure. The controller controls display of the first window 511 and 512 and the second window 521 and 522 based on the window information about the first window 511 and 512 and the window information about the second window 521 and 522. The controller controls display of the first window 511 and 512 and the second window 521 and 522 in the same manner as displayed at the moment of receiving the iconize input as illustrated in FIG. 5A. Therefore, user convenience may be maximized in that the user can reproduce an optimized configuration of a plurality of windows. For example, the user may readily use applications frequently used at a home such as a Web browser application, a chat application, and a media player application by setting a home-use shortcut icon for the frequently used applications. Or the user may readily use applications frequently used at a school such as a Web browser application, a memo application, and a dictionary application by setting a school-use shortcut icon for the frequently used applications.

Figure 6A:
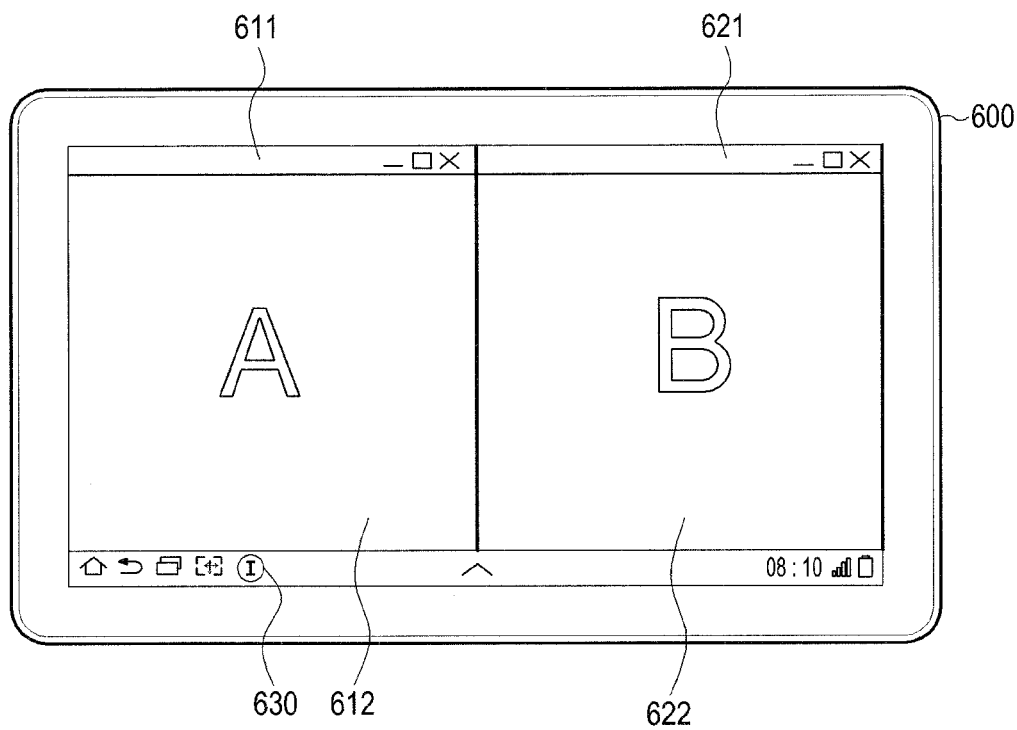
FIGS. 6A, 6B, and 6C illustrate an operation of a display device according to an embodiment of the present disclosure.
Figure 6B:
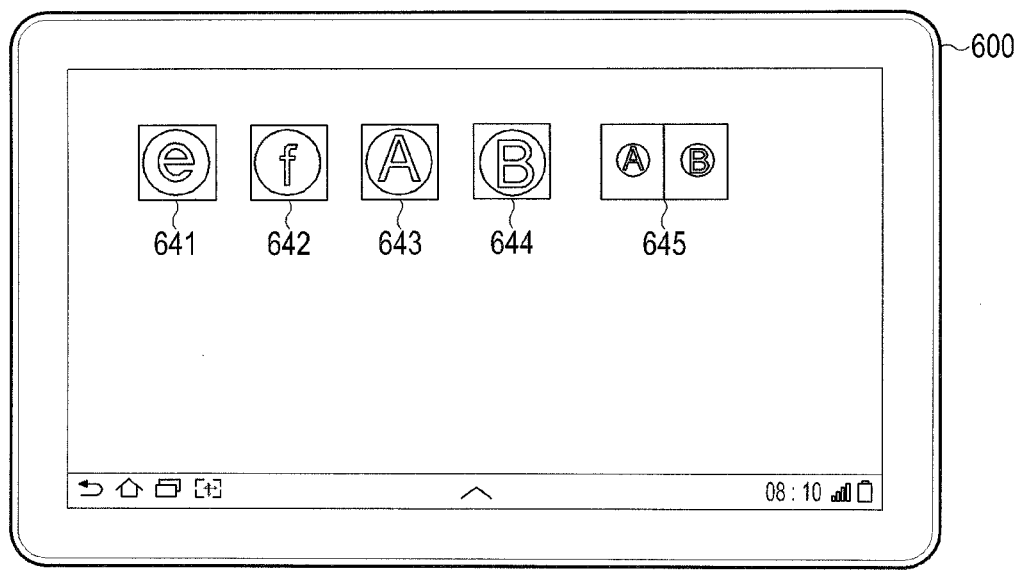
Figure 6C:
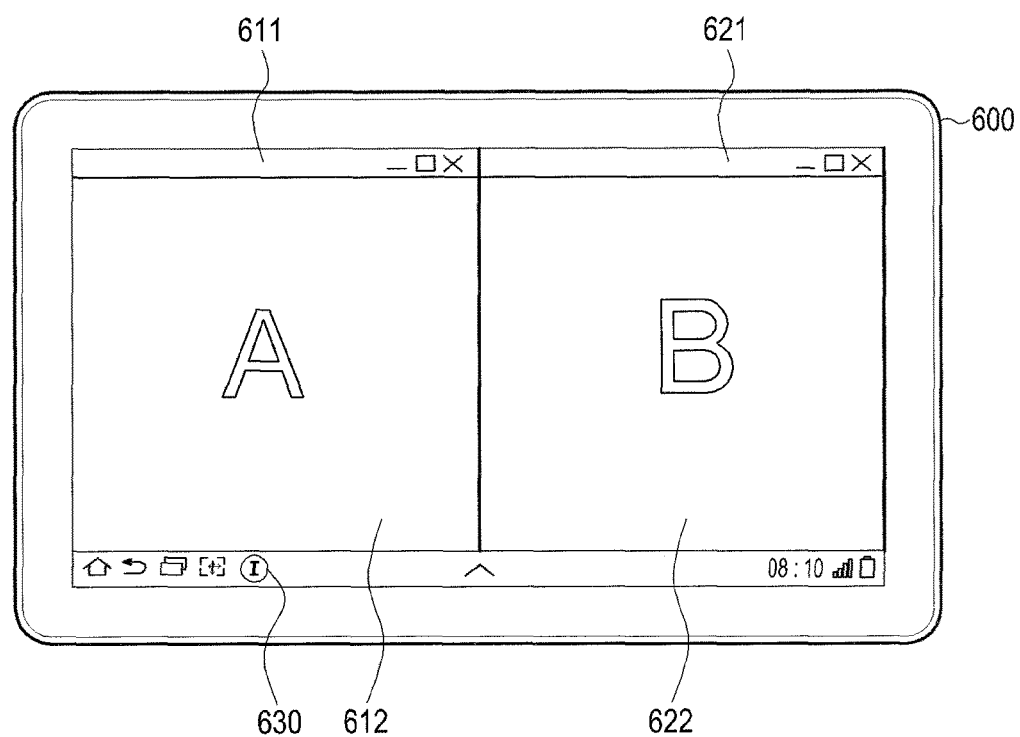

FIGS. 6A, 6B, and 6C illustrate an operation of a display device according to an embodiment of the present disclosure. Compared to FIGS. 5A, 5B, and 5C illustrating an operation in the free style mode, FIGS. 6A, 6B, and 6C illustrate an operation in the split mode.

Referring to FIG. 6A, a display device 600 may display a first window 611 and 612 and a second window 621 and 622 on a touch screen. The first window 611 and 612 may include a first title bar 611 and an execution screen 612 of a first application, and the second window 621 and 622 may include a second title bar 621 and an execution screen 622 of a second application. The display device 600 may further display an iconize button 630. Unlike FIG. 5A, the iconize button 630 is displayed in a bottom bar in FIG. 6A.

Upon selection of the iconize button 630, a controller (not shown) checks window information about each of the first windows 611 and 612 and the second window 621 and 622. More specifically, the controller may determine at least one of the type of the first application executed in the first window 611 and 612, the size of the first window 611 and 612, and the display position of the first window 611 and 612. The controller may determine at least one of the type of the second application executed in the second window 621 and 622, the size of the second window 621 and 622, and the display position of the second window 621 and 622. For example, a multi-window manager may invoke an API from a task manager and a window manager of a framework and check window information about each window. The window information about each window may further include information about an execution state of an application executed in the window.

The controller may check the window information about the first window 611 and 612 and the second window 621 and 622 and may discontinue displaying the first window 611 and 612 and the second window 621 and 622. In addition, the controller may generate a shortcut icon that enables simultaneous execution of the first application in the first window 611 and 612 and the second application in the second window 621 and 622.

FIG. 6B illustrates a menu screen displaying a shortcut icon according to an embodiment of the present disclosure. Referring to FIG. 6B, the controller of the display device 600 controls display of a shortcut icon 645 along with application execution icons 641, 642, 643, and 644. The shortcut icon 645 may be, for example, a composite image including a thumbnail image of the first application and a thumbnail image of the second application.

The user may select the shortcut icon 645 to execute the first and second applications simultaneously. When the controller determines that the shortcut icon 645 has been selected, the controller may read the window information about the first window 611 and 612 and the window information about the second window 621 and 622.

FIG. 6C illustrates a display device according to an embodiment of the present disclosure. The controller of the display device 600 controls display of the first window 611 and 612 and the second window 621 and 622 based on the window information about the first window 611 and 612 and the window information about the second window 621 and 622. The controller controls display of the first window 611 and 612 and the second window 621 and 622 in the same manner as displayed at the moment of receiving the iconize input as illustrated in FIG. 6A. The display device 600 may further display an iconize button 630. As described before, methods for controlling a display device according to the present disclosure are applicable to both the free style mode and the split mode.

Figure 7:
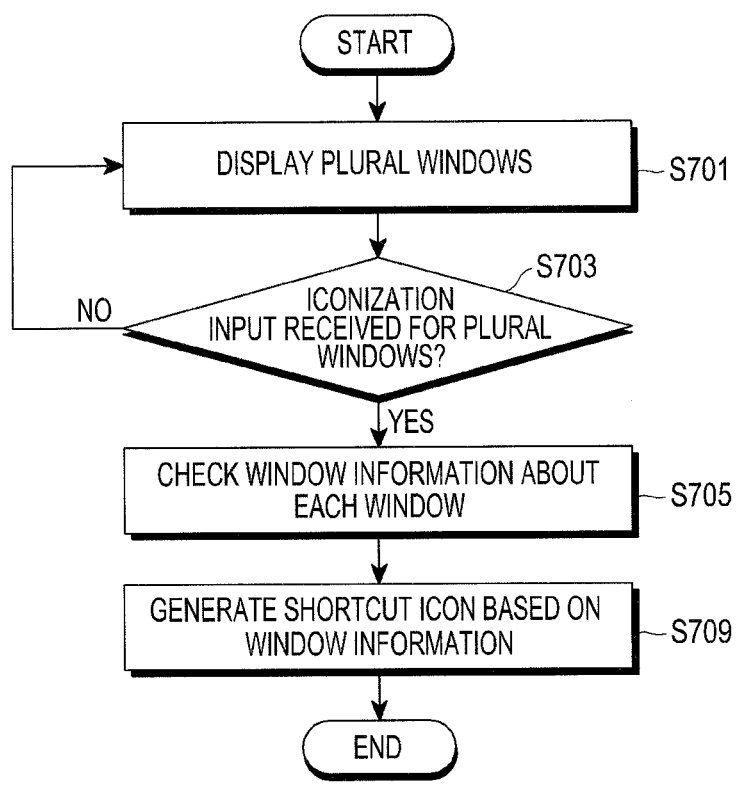
FIG. 7 is a flowchart illustrating a method for controlling a display device according to an embodiment of the present disclosure.

FIG. 7 is a flowchart illustrating a method for controlling a display device according to an embodiment of the present disclosure.

Referring to FIG. 7, the display device may display a plurality of windows one to one corresponding to a plurality of windows in operation S701. The display device may display the plurality of windows in the split mode or the free style mode.

The display device may receive an iconize input that iconizes the plurality of windows in operation S703. For example, the display device may display an iconize button in a partial area or a bottom bar of a touch screen. The display device may receive the iconize input by determining whether the iconize button has been selected. Or the display device may display a capture button that captures an execution screen and receive the iconize input by determining whether the capture button has been pressed for a long period of time (e.g., equal or greater than a threshold amount of time).

The display device may check window information about each of the plurality of windows in operation S705. The window information about each window may include information about at least one of the type of an application executed in the window, the position of the window, and the size of the window. The window information may further include information about an execution state of the application. Table 1 below illustrates exemplary window information according to an embodiment of the present disclosure.

TABLE 1

| | Window information | |
| --- | --- | --- |
| | First window | Second window |
| Application type | Web browsing application | Memo application |
| Window position | (130, 90) | (245, 30) |
| Window size | (130, 90), (130, 70), (150, 90), (150, 70) | (245, 30), (245, 78) (290, 30), (290, 78) |
| Application execution state | URI: http://www.ss.com | Second memo |

Referring to Table 1, the window information specifies the type of an application executed in the first window as Web browsing application, the position of the first window as (130, 90), the size of the first window as (130, 90), (130, 70), (150, 90), and (150, 70), and the execution state of the application as a final input Universal Resource Location (URI), http://www.ss.com. Further, the window information specifies the type of an application executed in the second window as memo application, the position of the second window as (245, 30), the size of the second window as (245, 30), (245, 78) (290, 30), and (290, 78), and the execution state of the application as a final memo being a second memo.

The display device may store the checked window information. The display device may discontinue displaying the plurality of windows and create a shortcut icon in operation S709. The shortcut icon is used to simultaneously execute the plurality of applications.

Figure 8:
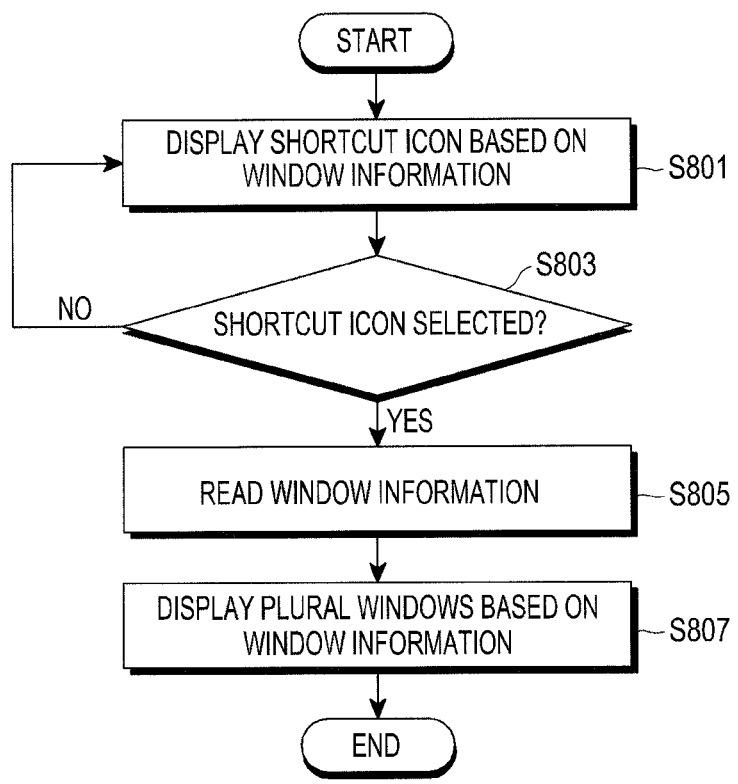
FIG. 8 is a flowchart illustrating a method for controlling a display device according to an embodiment of the present disclosure.

FIG. 8 is a flowchart illustrating a method for controlling a display device according to an embodiment of the present disclosure.

Referring to FIG. 8, the display device may display a shortcut icon that enables simultaneous execution of a plurality of applications in operation S801. A user may select the shortcut icon, for simultaneous execution of the plurality of applications. The display device may determine whether the shortcut icon has been selected in operation S803. If the shortcut icon has not been selected in operation S803, the display device keeps the shortcut icon displayed in operation S801. On the other hand, if the shortcut icon has been selected in operation S803, the display device reads stored window information about the plurality of applications in operation S805.

The display device displays a plurality of windows again based on the window information in operation S807. The display device may display the applications in the windows of the same sizes at the same positions as displayed at the moment of receiving an iconize input for the plurality of windows.

Figure 9:
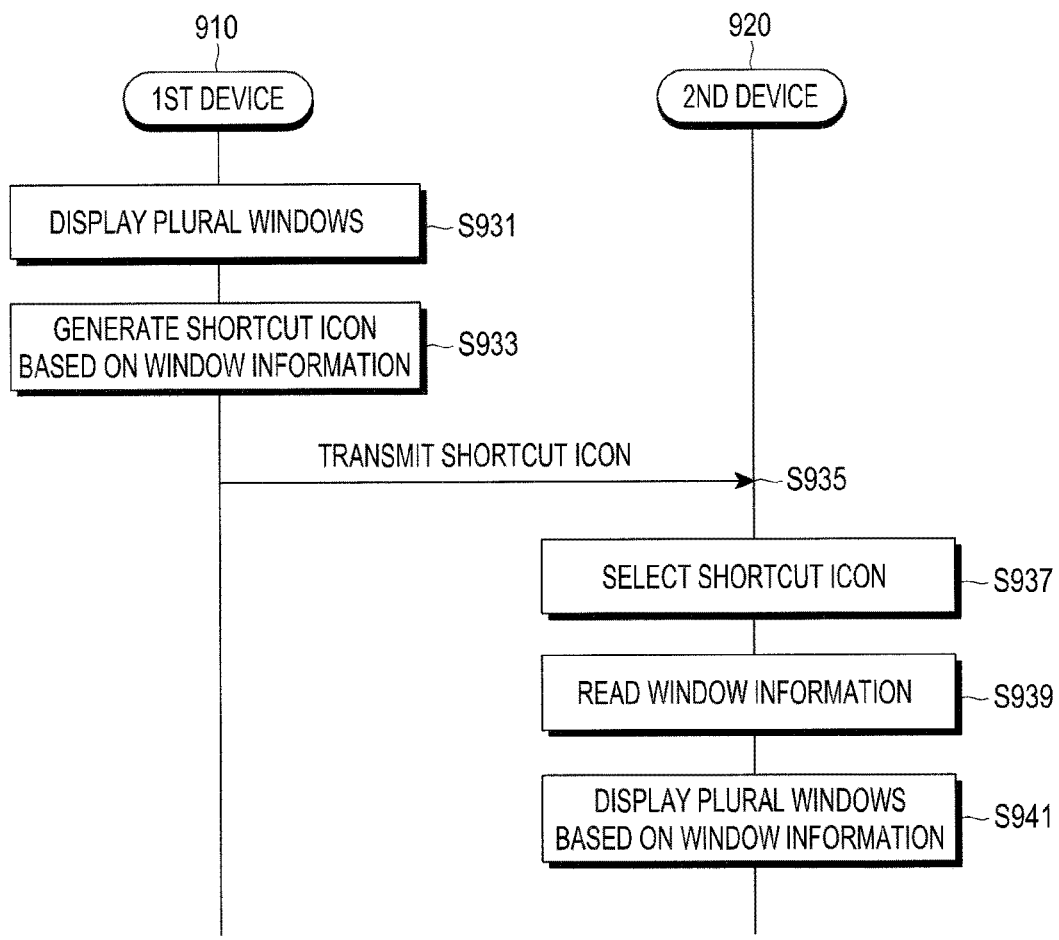
FIG. 9 is a diagram illustrating a signal flow for a method for controlling a display device according to an embodiment of the present disclosure.

FIG. 9 is a diagram illustrating a signal flow for a method for controlling a display device according to an embodiment of the present disclosure.

Referring to FIG. 9, a first display device 910 may transmit and receive specific data to and from a second display device 920. That is, each of the first display device 910 and the second display device 920 may include a communication module and thus may transmit and receive data through the communication module. The communication module may be a mobile communication module or a short-range communication module and those skilled in the art will readily understand that the present disclosure is not limited to any specific communication scheme.

The first display device 910 displays a plurality of windows in which a plurality of applications are executed respectively in operation S931. The first display device 910 may receive an iconize input and may check window information based on the iconize input. The first display device 910 generates a shortcut icon based on the window information in operation S933. The first display device 910 may transmit information about the shortcut icon to the second display device 920 in operation S935. Specifically, the first display device 910 may transmit a thumbnail image of the generated shortcut icon and the window information to the second display device 920.

The second display device 920 receives the information about the shortcut icon in operation S935. Specifically, the second display device 920 may receive the thumbnail image of the generated shortcut icon and the window information.

The second display device 920 may display the shortcut icon and determine whether the shortcut icon has been selected in operation S937. Upon selection of the shortcut icon, the second display device 920 reads the window information in operation S939. The second display device 920 may display a plurality of windows based on the window information in operation S941. Herein, the second display device 920 may display the same plurality of windows as displayed in the first display device 910. If the second display device 920 is set to the same resolution as that of the first display device 910, the second display device 920 controls display of the plurality of windows at the same resolution. On the other hand, if the second display device 920 is set to a different resolution from that of the first display device 910, the second display device 920 may display the plurality of windows according to a predetermined conversion procedure.

Figure 10:
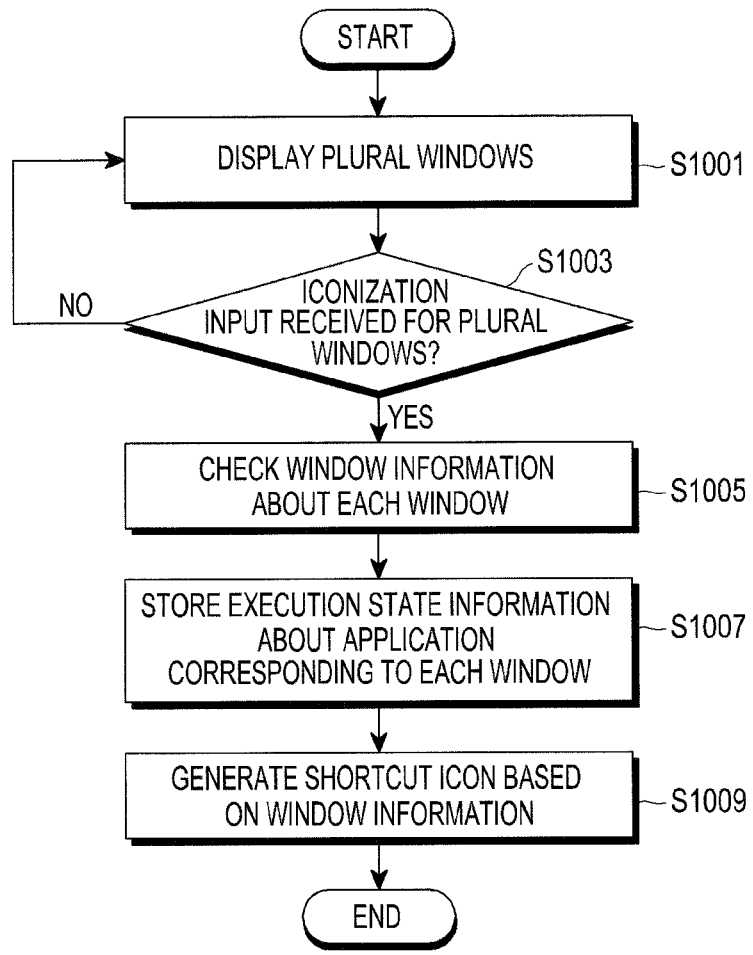
FIG. 10 is a flowchart illustrating a method for controlling a display device according to an embodiment of the present disclosure.

FIG. 10 is a flowchart illustrating a method for controlling a display device according to an embodiment of the present disclosure.

Referring to FIG. 10, the display device may display a plurality of windows one to one corresponding to a plurality of windows in operation S1001. The display device may display the plurality of windows in the split mode or the free style mode.

The display device may receive an iconize input that iconizes the plurality of windows in operation S1003.

The display device may check window information about each of the plurality of windows in operation S1005. The window information about each window may include information about at least one of the type of an application executed in the window, the position of the window, and the size of the window. The window information may further include information about an execution state of the application in operation S1007.

The display device may store the checked window information. The display device may discontinue displaying the plurality of windows and create a shortcut icon in operation S1009. The shortcut icon is used to simultaneously execute the plurality of applications.

Figure 11:
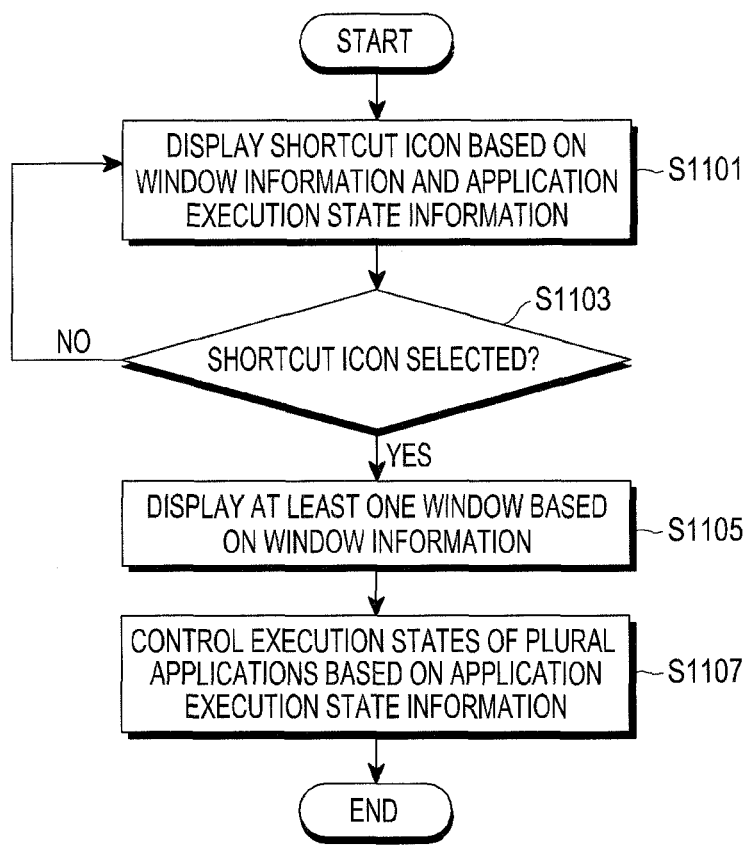
FIG. 11 is a flowchart illustrating a method for controlling a display device according to an embodiment of the present disclosure.

FIG. 11 is a flowchart illustrating a method of controlling a display device according to another embodiment of the present disclosure.

Referring to FIG. 11, the display device may display a shortcut icon that enables simultaneous execution of a plurality of applications in operation S1101. A user may select the shortcut icon, for simultaneous execution of the plurality of applications. The display device may determine whether the shortcut icon has been selected in operation S1103. If the shortcut icon has not been selected in operation S1103, the display device keeps the shortcut icon displayed in operation S1101. On the other hand, if the shortcut icon has been selected in operation S1103, the display device reads stored window information in operation S1105.

The display device controls reproduction of the execution states of the plurality of applications based on the read window information in operation S1107. The display device may display the applications in the windows of the same sizes at the same positions as displayed at the moment of receiving an iconize input for the plurality of windows. In addition, the display device may control reproduction of the same states of the applications as displayed at the moment of receiving the iconize input.

FIGS. 12A, 12B, 12C, 12D, 12E, 12F, 12G, 12H, 12I, 12J, 12K, 12L, 12M, 12N, 12O, 12P, 12Q, and 12R illustrate display devices according to various embodiments of the present disclosure.

Figure 12A:
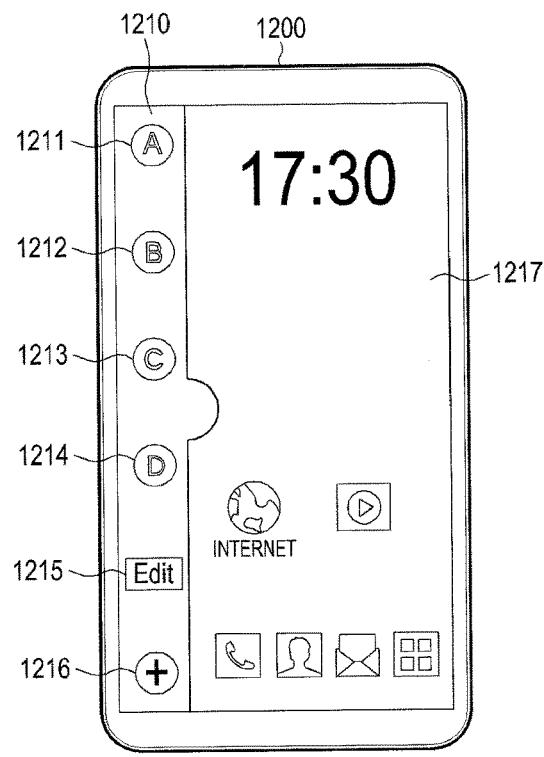
FIGS. 12A, 12B, 12C, 12D, 12E, 12F, 12G, 12H, 12I, 12J, 12K, 12L, 12M, 12N, 12O, 12P, 12Q, and 12R illustrate display devices according to various embodiments of the present disclosure.

Referring to FIG. 12A, a display device 1200 displays a menu screen 1217. The menu screen 1217 may be an execution screen of a launcher program and may include icons with which to execute applications. The menu screen 1217 may further include information about a current time and, in addition, may include a widget. Referring to one or more of FIGS. 12A, 12B, 12C, 12D, 12E, 12F, 12G, 12H, 12I, 12J, 12K, 12L, 12M, 12N, 12O, 12P, 12Q, and 12R, the display device 1200 displays a tray 1210 at a left side of a touch screen, which contains icons 1211, 1212, 1213, and 1214 representing executable applications. The tray 1210 may further contain a shortcut icon edit button 1215 and a shortcut icon generation button 1216.

Figure 12B:
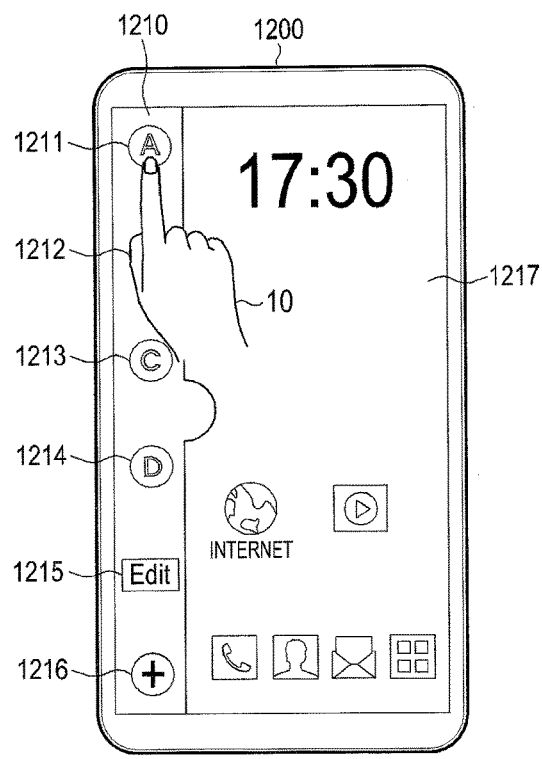
Figure 12C:
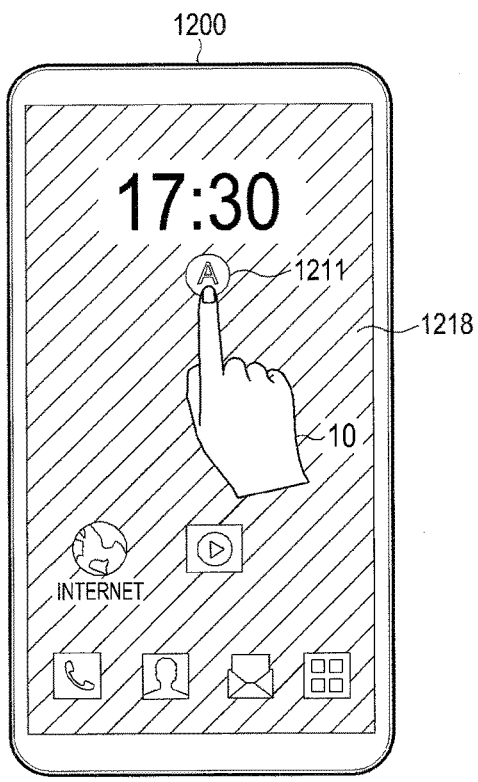

As illustrated in FIG. 12B, a user 10 may manipulate the user device 1200 to execute a first application A. For example, the user 10 may touch the icon 1211 representing the first application A and drag the touch to the menu screen 1217 as illustrated in FIG. 12C. A controller (not shown) of the display device 1200 may control display of the icon 1211 at the dragged position. The controller may further control display of a ghost view 1218 at the dragged position. The ghost view 1218 refers to a preview that displays the size and shape of a window in which an application will be executed, so that the user 10 may select the position of the window. Because no window is displayed, the controller may display the ghost view 1218 in full screen. As described later in detail, the controller may control full-screen display of a ghost view in the absence of any window already displayed on the touch screen. If a single window is already displayed on the touch screen, the controller may display the ghost view in a size and shape corresponding to a half of the touch screen. If two windows are already displayed on the touch screen, the controller may display the ghost view in a size and shape corresponding to a half of one of the two windows on the touch screen.

Figure 12D:
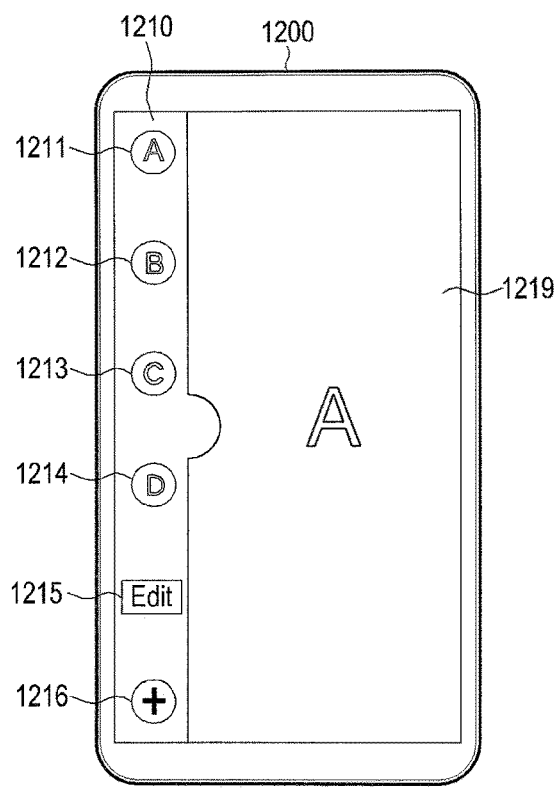

The controller may recognize the foregoing drag gesture as a command to execute a new application. The controller may generate a first window 1219 to execute the first application A. The controller may control display of the first window 1219 in full screen as illustrated in FIG. 12D.

Figure 12E:
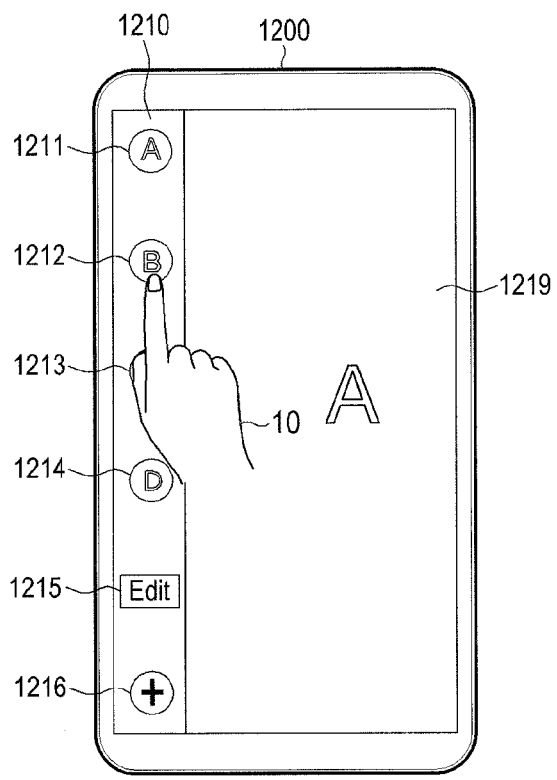
Figure 12F:
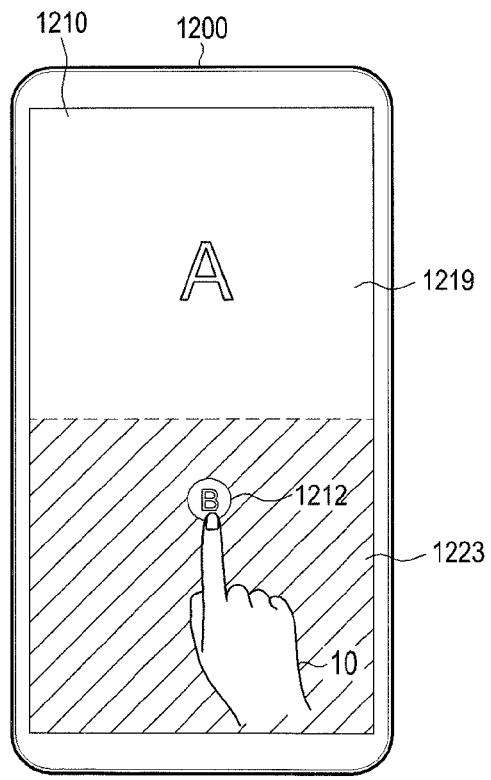

The user 10 may manipulate the display device 1200 to additionally execute a second application B. For example, the user may touch the icon 1212 representing the second application B as illustrated in FIG. 12E and then drag the touched icon 1212 to a lower part of the first window 1219 as illustrated in FIG. 12F. The controller may control display of the icon 1212 at the dragged position. In addition, the controller may control display of a ghost view 1223 at the dragged position. As described before, since the single window 1219 is already displayed on the touch screen, the controller may control display of the ghost view 1223 in a size and shape corresponding to a half of the touch screen. While not shown, if the user 10 drags the touched icon 1212 to an upper part of the touch screen, the controller controls display of the ghost view 1223 in an upper half of the touch screen. Displaying the ghost view in a lower half of the touch screen is purely exemplary. Thus the controller may divide the touch screen into left and right halves and may control display of the ghost view in one of the left and right halves of the touch screen.

Figure 12G:
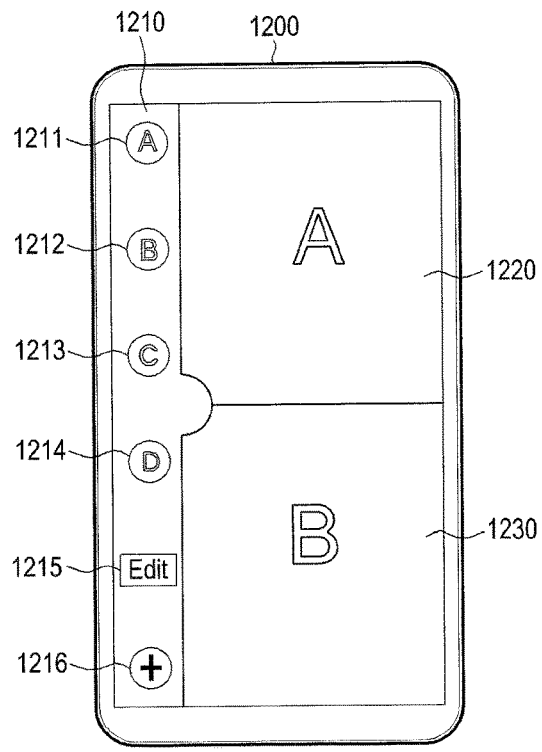

If the user releases the drag in the lower part of the touch screen as illustrated in FIG. 12F, the controller determines that a new application execution command has been received. As illustrated in FIG. 12G, the controller controls display of a second window 1230 in the lower half of the touch screen in correspondence with the ghost view 1223 illustrated in FIG. 12F. Further, the controller shrinks down the first window 1219 in size and shape, thus producing a first window 1220 so that the first window 1220 may be displayed in the upper half of the touch screen.

Figure 12H:
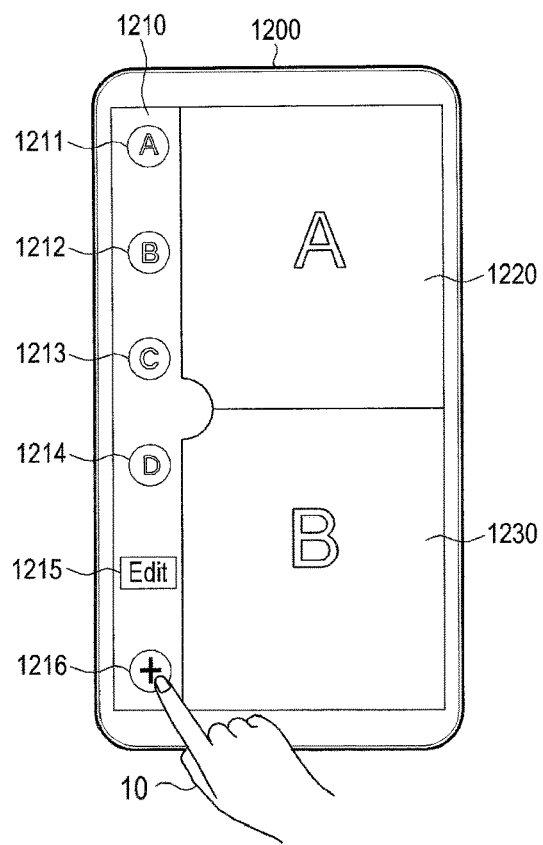
Figure 12I:
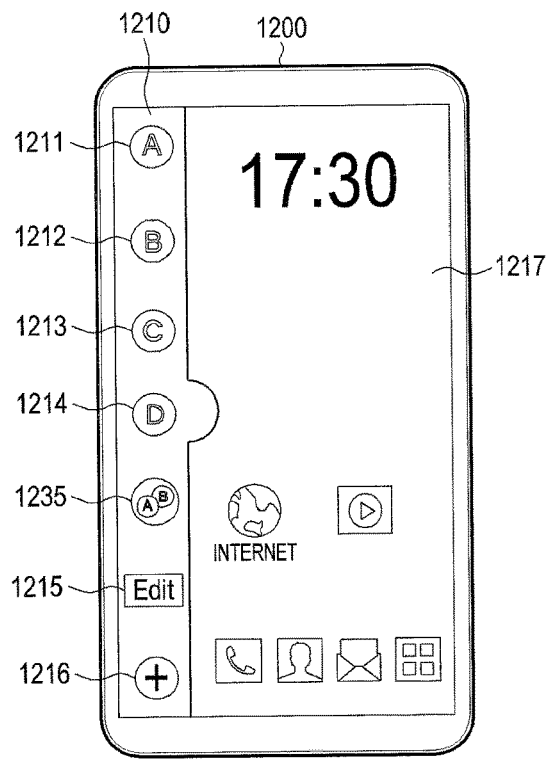

The user 10 may generate a shortcut icon for the first window 1220 executed in the upper half of the touch screen and the second window 1230 executed in the lower half of the touch screen. For example, the user 10 may select the shortcut icon generation button 1216 as illustrated in FIG. 12H. Selection of the shortcut icon generation button 1216 may be an exemplary command to generate a shortcut icon. Those skilled in the art will readily understand that a shortcut icon generation command may be issued in a manner other than selection of the shortcut icon generation button 1216.

Upon receipt of the shortcut icon generation command, the controller may control generation and display of a shortcut icon 1235 in the tray 1210 as illustrated in FIGS. 12I, 12J, 12K, 12L, 12M, and 12N. Herein, the shortcut icon 1235 may be displayed as an image in which the icon 1211 representing the first application is overlapped with the icon 1212 representing the second application. Therefore, the user 10 may recognize all of the first and second application icon.

Figure 12J:
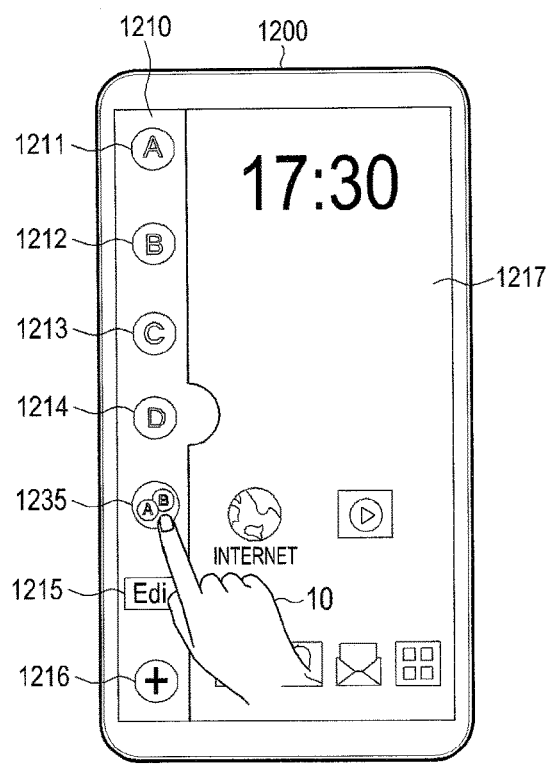
Figure 12K:
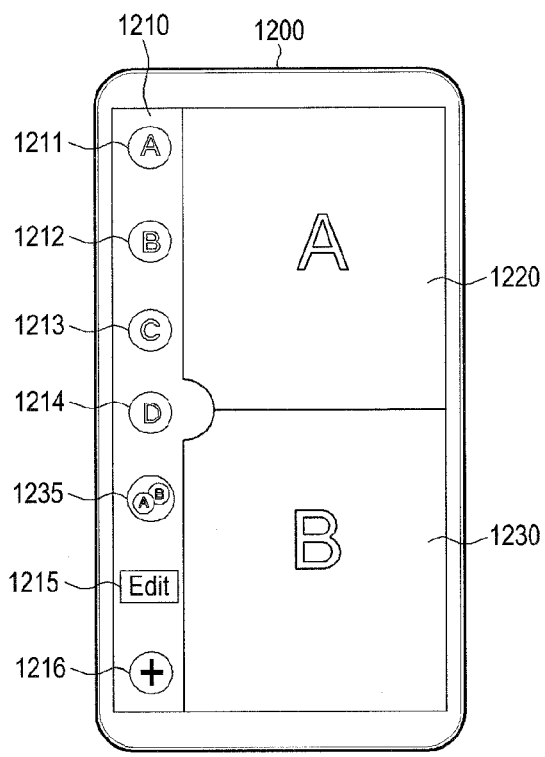

Upon receipt of a shortcut icon execution command as the user selects the shortcut icon 1235 as illustrated in FIG. 12J, the controller may execute and display the first window 1220 in the upper half of the touch screen and the second window 1230 in the lower half of the touch screen, as illustrated in FIG. 12K.

Figure 12L:
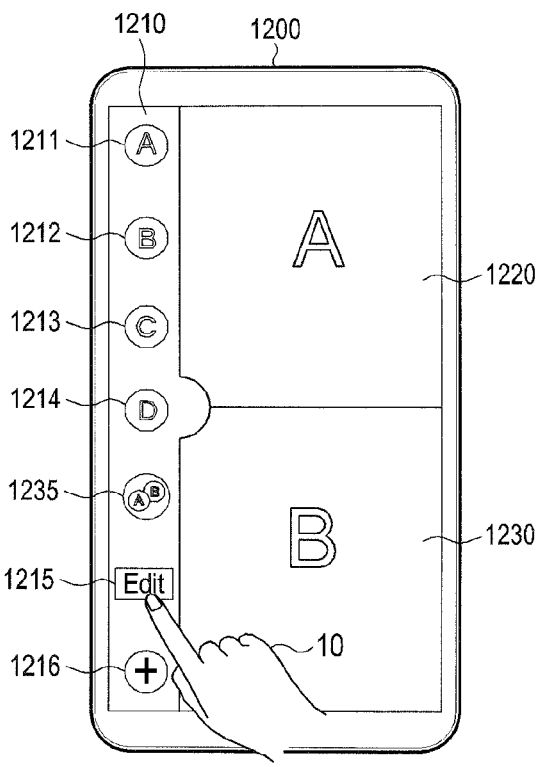
Figure 12M:
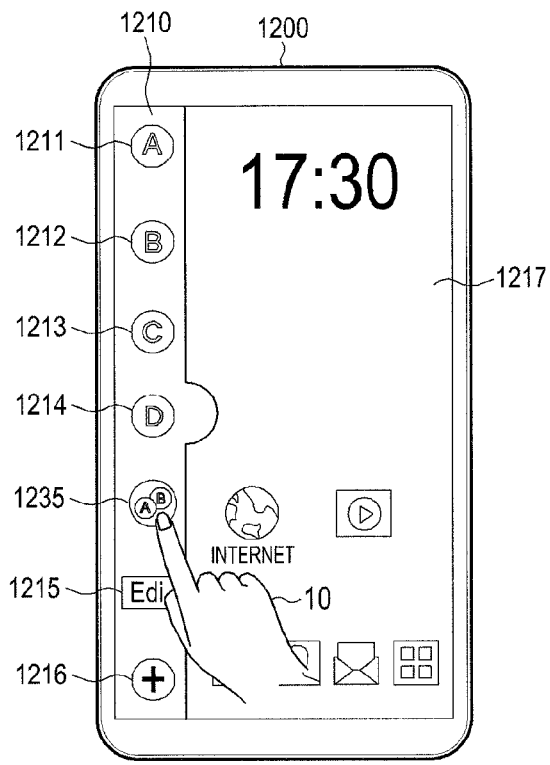
Figure 12N:
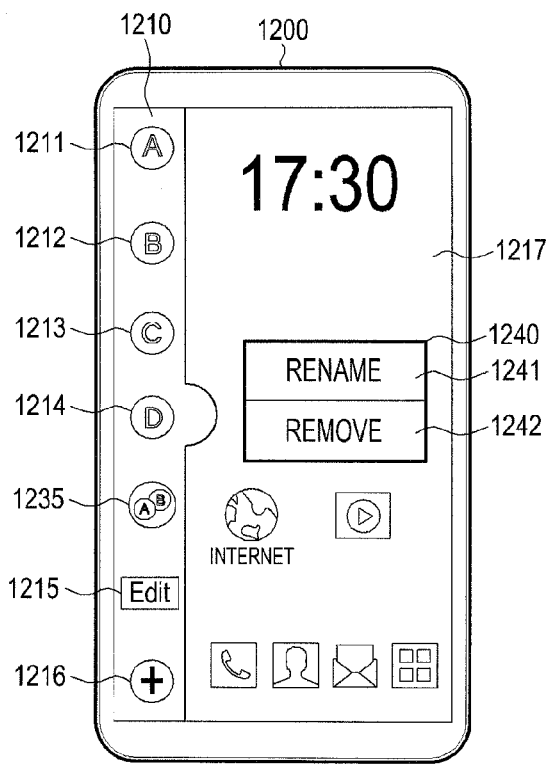

In another embodiment of the present disclosure, the user 10 may input a shortcut icon edit command by selecting the shortcut icon edit button 1215, as illustrated in FIG. 12L. In addition, the user 10 may select the shortcut icon 1235 to be edited as illustrated in FIG. 12M. Then the controller may display an edit screen 1240 in regards to the shortcut icon 1235 to be edited, as illustrated in FIG. 12N. The edit screen 1240 may include a rename tab 1241 that changes the name of the shortcut icon 1235 and a remove tab 1242 that deletes the shortcut icon 1235. Upon selection of the rename tab 1241, the controller may control providing of a UI through which the name of the shortcut icon 1235 is to be changed. Upon selection of the remove tab 1242, the controller may delete the shortcut icon 1235.

Figure 12O:
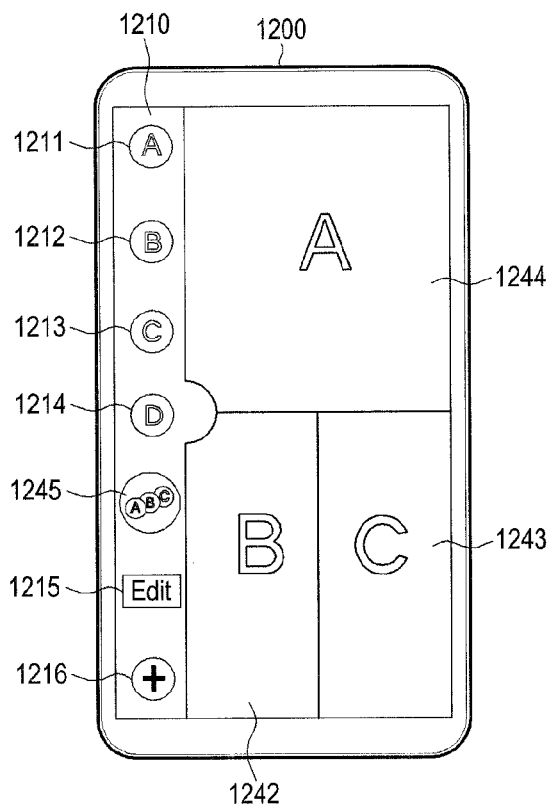

FIG. 12O illustrates a display device according to an embodiment of the present disclosure. Referring to FIG. 12O, a controller (not shown) may control display of a screen divided into three parts. For example, the controller may control display of a first window 1244 in which the first application A is executed in an upper half of the touch screen, a second window 1242 in which the second application B is executed in a left half of a lower half of the touch screen, and a third window 1243 in which a third application C is executed in a right half of the lower half of the touch screen. The user may select the shortcut icon generation button 1216. Then the controller may control generation and display of a shortcut icon 1245. For example, the shortcut icon 1245 may be displayed as an image in which the first icon 1211, the second icon 1212, and the third icon 1213 are overlapped with one another.

Figure 12P:
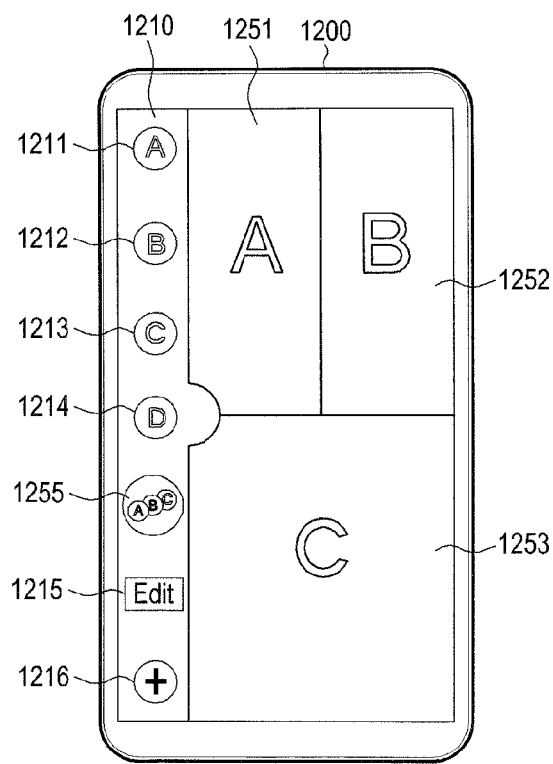

FIG. 12P illustrates a display device according to an embodiment of the present disclosure. Referring to FIG. 12P, A controller (not shown) may control display of a screen divided into three parts. For example, the controller may control display of a first window 1251 in which the first application A is executed in a left half of an upper half of the touch screen, a second window 1252 in which the second application B is executed in a right half of the upper half of the touch screen, and a third window 1253 in which the third application C is executed in a lower half of the touch screen. The user may select the shortcut icon generation button 1216. Then the controller may control generation and display of a shortcut icon 1255. For example, the shortcut icon 1255 may be displayed as an image in which the first icon 1211, the second icon 1212, and the third icon 1213 are overlapped with one another.

Figure 12Q:
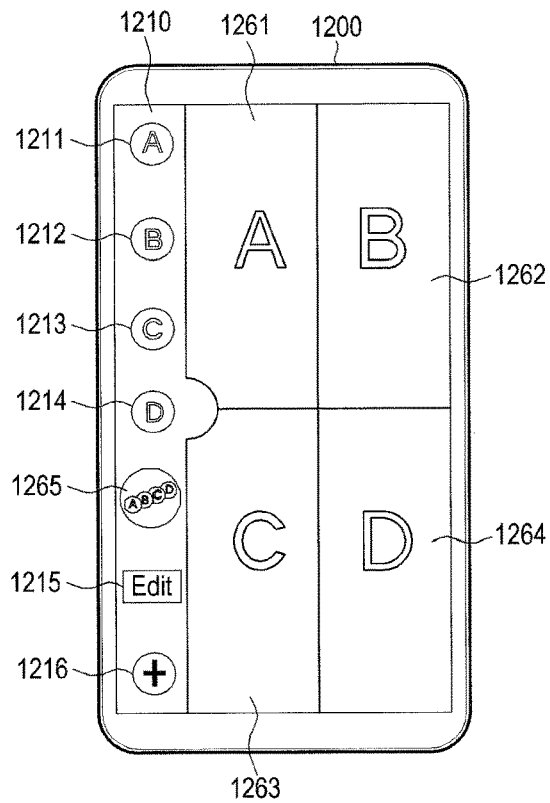

FIG. 12Q illustrates a display device according to an embodiment of the present disclosure. Referring to FIG. 12Q, the controller may control display of a screen divided into four parts. For example, a controller (not shown) may control display of a first window 1261 in which the first application A is executed in a left half of an upper half of the touch screen, a second window 1262 in which the second application B is executed in a right half of the upper half of the touch screen, a third window 1263 in which the third application C is executed in a left half of a lower half of the touch screen, and a fourth window 1264 in which a fourth application D is executed in a right half of the lower half of the touch screen.

The user may select the shortcut icon generation button 1216. Then the controller may control generation and display of a shortcut icon 1265. For example, the shortcut icon 1265 may be displayed as an image in which the first icon 1211, the second icon 1212, the third icon 1213, and the fourth icon 1214 are overlapped with one another.

Figure 12R:
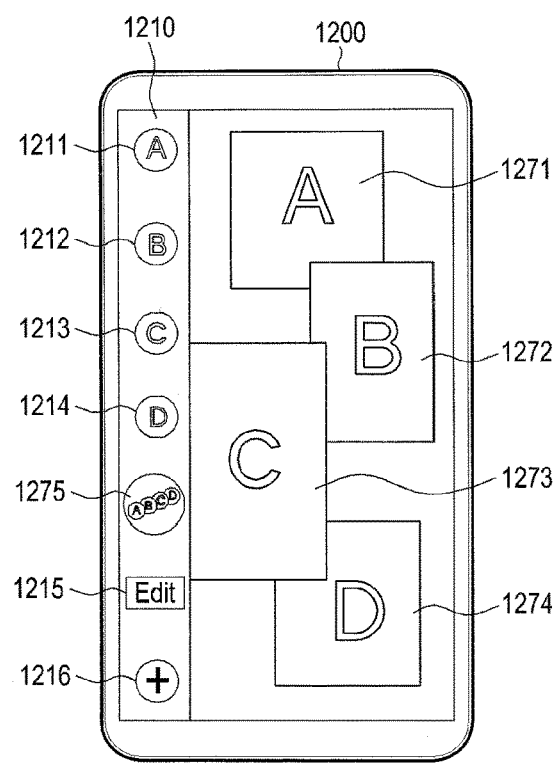

FIG. 12R illustrates a display device according to an embodiment of the present disclosure. Referring to FIG. 12R, a controller (not shown) may control display of a first window 1271 in which the first application A is executed, a second window 1272 in which the second application B is executed, a third window 1273 in which the third application C is executed, and a fourth window 1274 in which a fourth application D is executed. The controller may display the first, second, third, and fourth windows 1271, 1272, 1273, and 1274 overlapped with one another according to the display priority levels of the first, second, third, and fourth windows 1271, 1272, 1273, and 1274. The user may select the shortcut icon generation button 1216. Then the controller may control generation and display of a shortcut icon 1275. For example, the shortcut icon 1275 may be displayed as an image in which the first icon 1211, the second icon 1212, the third icon 1213, and the fourth icon 1214 are overlapped with one another.

Figure 13A:
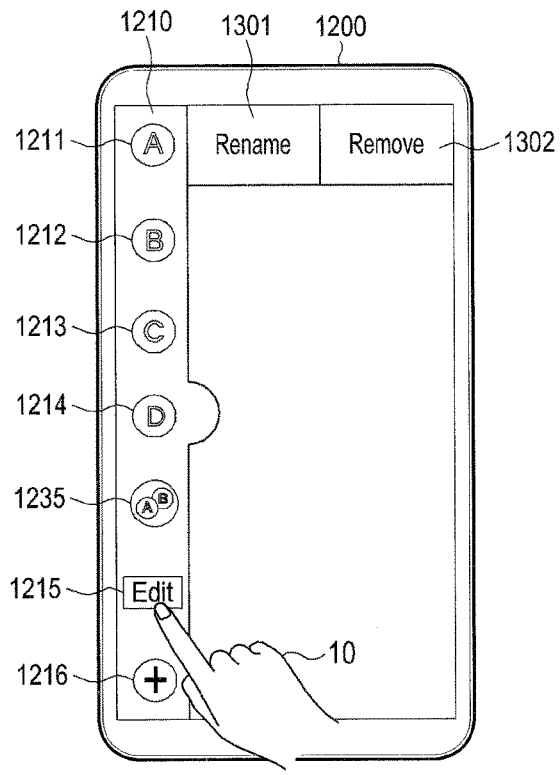
FIGS. 13A, 13B, 13C, 13D, and 13E illustrate screens displayed on a display device according to various embodiments of the present disclosure.
Figure 13B:
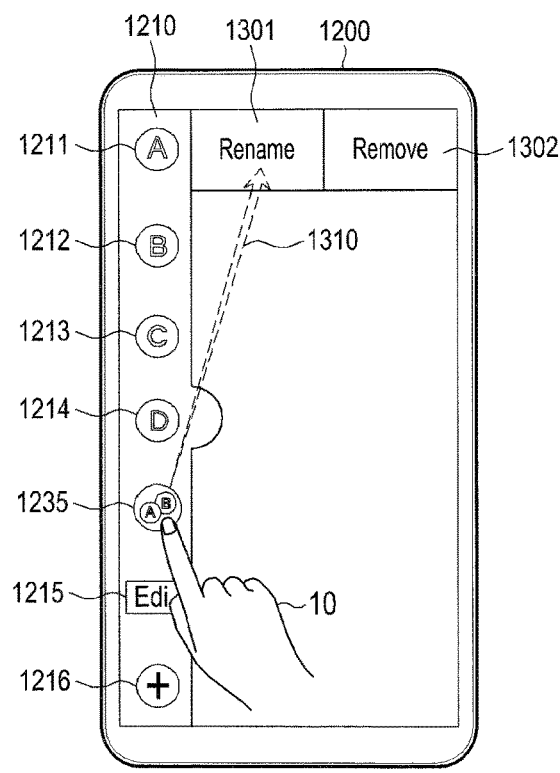
Figure 13C:
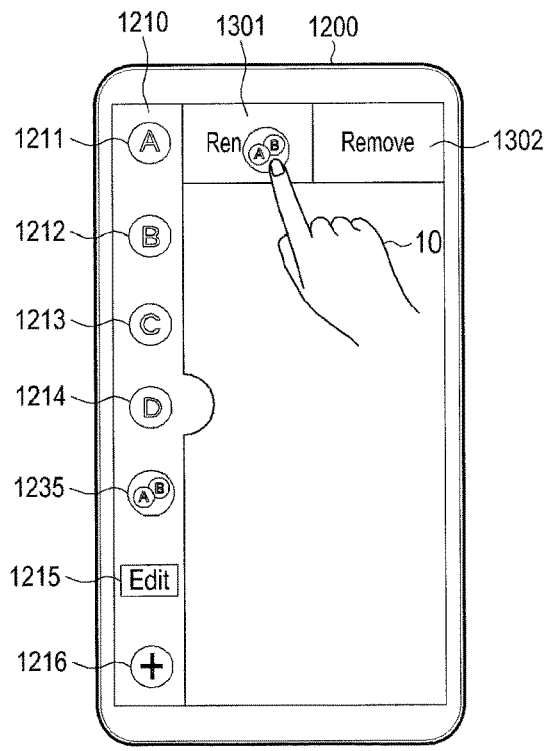

FIGS. 13A, 13B, 13C, 13D, and 13E illustrate screens displayed on a display device according to various embodiments of the present disclosure. Referring to FIGS. 13A, 13B, 13C, 13D, and 13E, the display device 1200 displays a tray 1210 at a left side of a touch screen, which contains icons 1211, 1212, 1213, and 1214 representing executable applications. The tray 1210 may further contain a shortcut icon 1235, a shortcut icon edit button 1215, and a shortcut icon generation button 1216. Referring to FIG. 13A, the controller may control display of a rename icon 1301 and a remove icon 1302. Referring to FIGS. 13B and 13C, the user 10 may input a shortcut icon rename command by making a drag gesture 1310 of dragging the shortcut icon 1235 to the rename icon 1301. The controller moves the shortcut icon 1235 in correspondence with the drag gesture 1310. When the drag is released from the rename icon 1301, the controller may provide a rename UI in which the name of the shortcut icon 1235 may be changed. In another embodiment of the present disclosure, upon receipt of the shortcut rename command by the user's long pressing of the shortcut icon 1235, the controller may display the rename UI to rename the shortcut icon 1235.

Figure 13D:
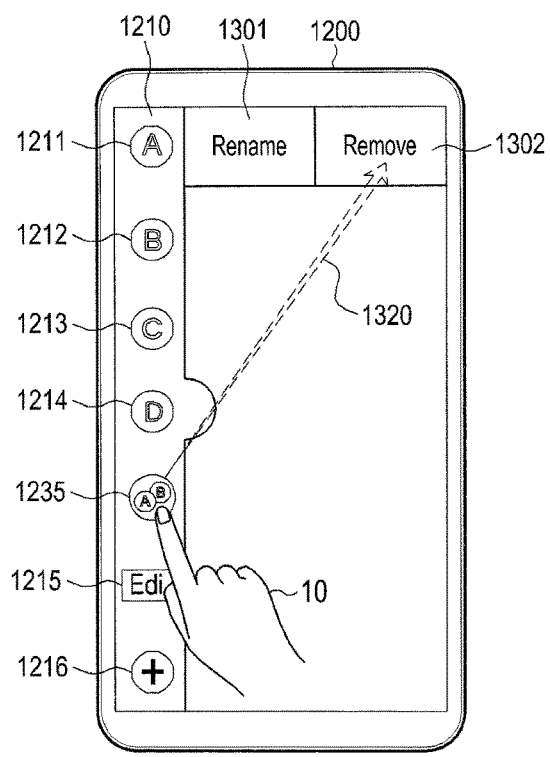
Figure 13E:
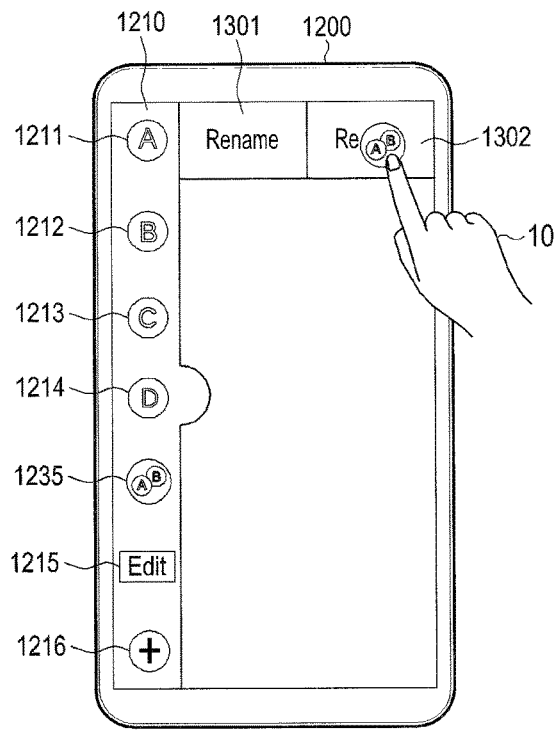

Referring to FIGS. 13D and 13E, the user 10 may input a shortcut icon remove command by making a drag gesture 1320 of dragging the shortcut icon 1235 to the remove icon 1302. The controller may move the shortcut icon 1235 in correspondence with the drag gesture 1320. When the drag is released from the remove icon 1302, the controller may remove the shortcut icon 1235.

Figure 13F:
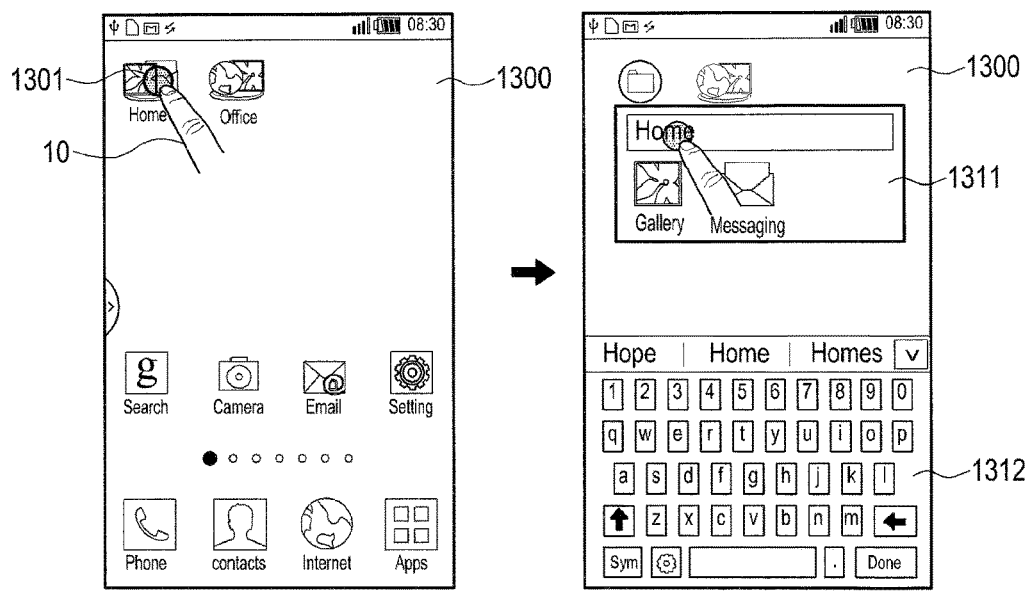
FIG. 13F illustrates a rename User Interface (UI) according to an embodiment of the present disclosure.

FIG. 13F illustrates a rename UI according to an embodiment of the present disclosure. The rename UI of the display device 1300 may include a rename window 1311 and a keyboard 1312. The user 10 may select the rename icon 1301, which causes the rename window 1311 and the keyboard 1312 to be displayed.

Figure 14A:
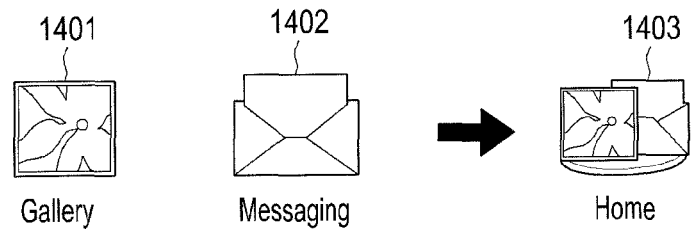
FIGS. 14A and 14B illustrate shortcut icons according to various embodiments of the present disclosure.
Figure 14B:
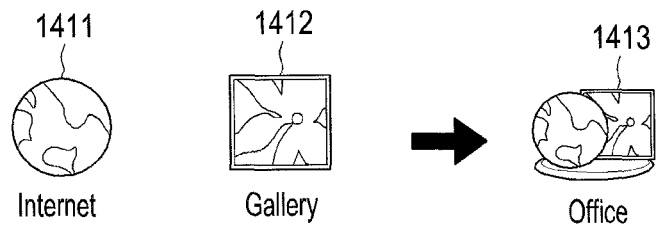

FIGS. 14A and 14B illustrate shortcut icons according to various embodiments of the present disclosure. In FIG. 14A, a shortcut icon 1403 is shown as a combination of a gallery application icon 1401 and a messaging application icon 1402. In FIG. 14B, a shortcut icon 1413 is shown as a combination of a Web browsing application icon 1411 and a gallery application icon 1412. As illustrated in FIGS. 14A and 14B, the shortcut icon 1403 may be displayed as an image in which the two icons 1401 and 1402 are overlapped with each other and the shortcut icon 1413 may be displayed as an image in which the two icons 1411 and 1412 are overlapped with each other. Therefore, the user may readily identify applications that may be simultaneously executed by the shortcut icons 1403 and 1413.

Figure 15A:
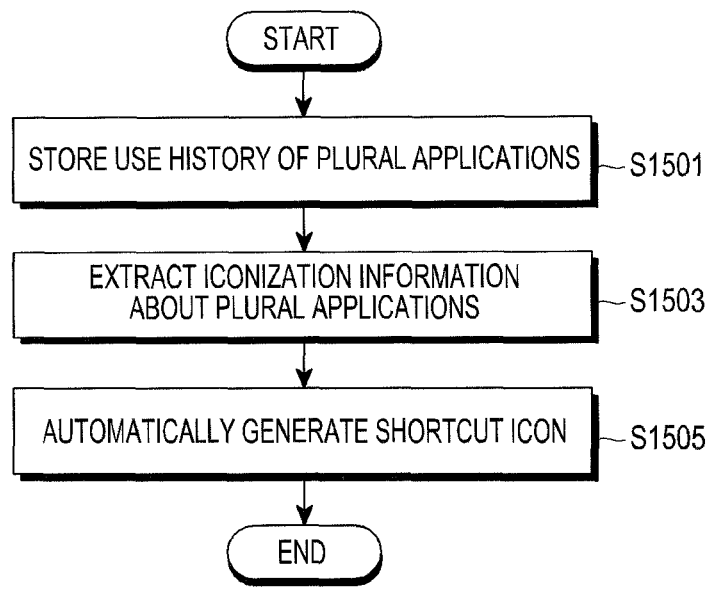
FIGS. 15A and 15B are flowcharts illustrating methods for controlling a display device according to various embodiments of the present disclosure.
Figure 15B:
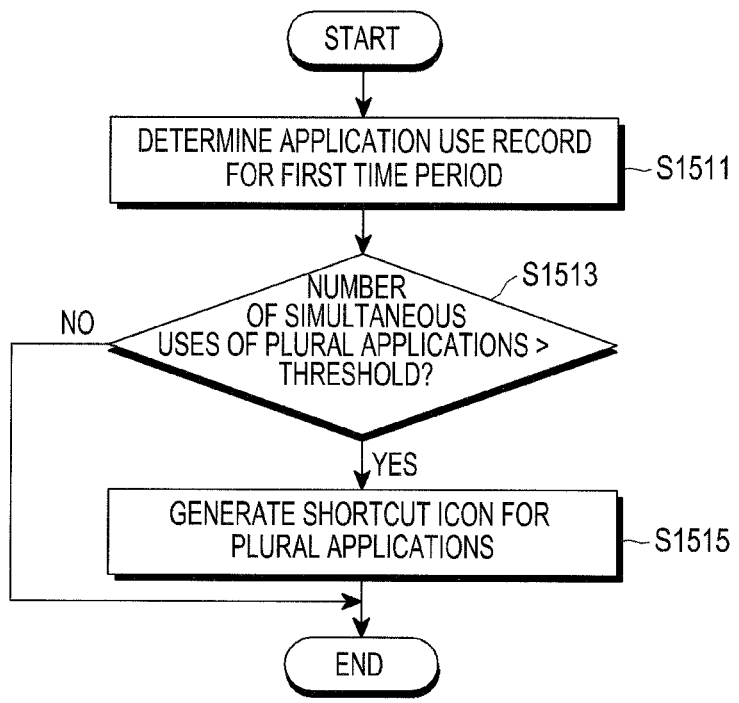

FIGS. 15A and 15B are flowcharts illustrating a method of controlling a display device according to various embodiments of the present disclosure.

Referring to FIG. 15A, a controller (not shown) may store a use history of a plurality of applications in operation S1501. For example, the controller may store a use history indicating that first and second applications have been used at a first time point. The controller may extract iconization information about a plurality of windows corresponding to the plurality of applications in operation S1503. For example, the controller may extract iconization information about the plurality of windows, indicating that the first and second applications have been used at the first time point. The controller may automatically generate a shortcut icon and display the generated shortcut icon in operation S1505. For example, the controller may automatically generate and display a shortcut icon representing the first and second applications in combination. Particularly, the controller may extract information about at least one of the position and size of each of the windows corresponding to the first and second applications as the iconization information about the plurality of windows. Upon receipt of a shortcut icon execution command, the controller may control display of the windows corresponding to the first and second applications according to at least one of the positions and sizes of the windows.

FIG. 15B is a flowchart illustrating a method of controlling a display device according to another embodiment of the present disclosure.

Referring to FIG. 15B, a controller (not shown) may determine an application use record at a first time point in operation S1511. The controller may compare the number of simultaneous uses of a plurality of applications with a threshold in operation S1513. If the number of simultaneous uses of the plurality of applications exceeds the threshold, the controller may generate and display a shortcut icon for the plurality of applications in operation S1515. Particularly, the controller may name the shortcut icon according to the first time point.

In another embodiment of the present disclosure, the controller may generate and display a shortcut icon for a plurality of latest applications that have been executed. Or the controller may generate and display a shortcut icon for a plurality of applications that have been used many times at a specific position based on position information about the display device.

Figure 15C:
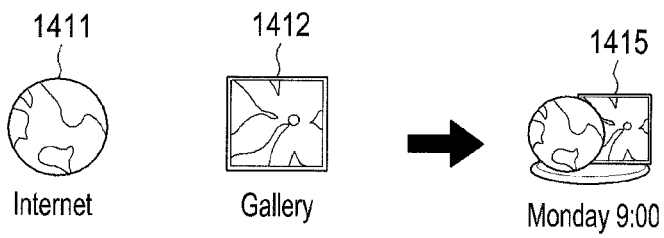
FIG. 15C illustrates a shortcut icon according to an embodiment of the present disclosure.

For example, the controller may detect a use pattern indicating simultaneous use of a Web browsing application 1411 and a gallery application 1412 at 9:00 on Monday. The controller may detect the use pattern by determining whether the number of simultaneous uses of the Web browsing application 1411 and the gallery application 1412 at 9:00 on Monday exceeds a threshold. The controller may generate and display a shortcut icon 1415 as illustrated in FIG. 15C. The controller may name the shortcut icon 1415 as "Monday 9:00" and may control display of the shortcut icon 1415 along with the name of the shortcut icon 1415.

Meanwhile, a method of controlling a display device according to another embodiment of the present disclosure may include displaying a plurality of windows in which applications are executed respectively on a display, receiving a request for generating a shortcut icon that executes the plurality of windows simultaneously, and generating and displaying the shortcut icon in a predetermined area of the display. If a user selects the shortcut icon while the plurality of windows disappear from the display, the method may further include displaying the plurality of windows simultaneously on the display. The shortcut icon may be displayed as an image in which icons representing the applications corresponding to the plurality of windows are combined. The combined display of the icons representing the applications corresponding to the plurality of windows may mean that one application icon is partially overlapped with another application icon. A description of this embodiment of the present disclosure may be pursuant to the descriptions of the foregoing embodiments of the present disclosure.

As is apparent from the above description, a display device that provides a user-created shortcut icon for simultaneously executes a plurality of applications and a method for controlling the display device can be provided according to various embodiments of the present disclosure. Therefore, since windows having user-desired positions or sizes are stored and the stored windows are simultaneously executed, user convenience can be maximized.

It will be understood that the various embodiments of the present disclosure can be implemented in hardware, software, or a combination thereof. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g., a computer), such as a Compact Disc (CD), a Digital Versatile Disc (DVD), a magnetic disk, or a magnetic tape. Further, the various embodiments of the present disclosure can be implemented in a computer or portable terminal that has a controller and a memory, and the memory is an example of a non-transitory machine-readable storage medium suitable for storing a program or programs including commands to implement the various embodiments of the present disclosure. Accordingly, the present disclosure includes a program having a code for implementing the apparatuses or methods defined by the claims and a non-transitory storage medium readable by a machine that stores the program. The program can be transferred electronically through a medium such as a communication signal transmitted via a wired or wireless connection, which and the equivalents of which are included in the present disclosure.

The device can receive the program from a program providing device connected by cable or wirelessly and store it. The program providing device may include a program including commands to implement the various embodiments of the present disclosure, a memory for storing information required for the various embodiments of the present disclosure, a communication module for communicating with the mobile device by cable or wirelessly, and a controller for transmitting the program to the device automatically or upon request of the device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a display device, the method comprising:
when a plurality of applications are executed simultaneously, controlling a display of an electronic device to display at least two user interfaces corresponding to at least two applications of the plurality of applications, respectively;
setting a shortcut icon based on information related to each of the at least two applications, wherein the information includes information regarding a number of times the at least two applications are executed simultaneously;
ending the executed at least two applications and removing the at least two user interfaces on the display;
controlling the display to display the shortcut icon;
in response to receiving an input for selecting the shortcut icon, simultaneously starting execution of each of the at least two applications; and
when the shortcut icon is selected, obtaining window information about the at least two user interfaces corresponding to the at least two applications and controlling the display to display the at least two user interfaces corresponding to the at least two applications based on the window information,
wherein the window information includes information about at least one of an application type, a position of the user interfaces, or a size of the user interfaces, and further includes information about an execution state of the application,
wherein the shortcut icon includes an object representing each of the at least two applications, and
wherein the shortcut icon is set when the number of times exceeds a threshold value.

2. The method of claim 1, further comprising:
extracting iconization information about the at least two applications from use history,
wherein the iconization information is information indicating that the at least two applications have been used at a first time point, and
wherein the shortcut icon is set by assigning a name including information about the first time point to the shortcut icon.

3. The method of claim 1, further comprising transmitting the set shortcut icon to another electronic device.

4. The method of claim 1, wherein the shortcut icon is displayed as a composite image in which thumbnail images of each of the at least two applications are overlapped.

5. The method of claim 1, further comprising:
editing the shortcut icon according to an edit command; and
displaying the edited shortcut icon.

6. The method of claim 5, wherein the shortcut icon edit command is one of a command to rename the shortcut icon and a command to remove the shortcut icon.

7. An electronic device comprising:
a display; and
at least one processor configured to:
when a plurality of applications are executed simultaneously, control the display to display at least two user interfaces corresponding to at least two applications of the plurality of applications, respectively,
set a shortcut icon based on information related to each of the at least two applications, wherein the information includes information regarding a number of times the at least two applications are executed simultaneously,
end the executed at least two applications and remove the at least two user interfaces on the display,
control the display to display the shortcut icon,
in response to receiving an input for selecting the shortcut icon, start simultaneous execution of each of the at least two applications, and
when the shortcut icon is selected, obtain window information about the at least two user interfaces corresponding to the at least two applications and control the display to display the at least two user interfaces corresponding to the at least two applications based on the window information,
wherein the window information includes information about at least one of an application type, a position of the user interaces, or a size of the user interfaces, and further includes information about an execution state of the application,
wherein the shortcut icon includes an object representing each of the at least two applications, and
wherein the shortcut icon is set when the number of times exceeds a threshold value.

8. The electronic device of claim 7,
wherein the at least one processor is further configured to:
extract iconization information about the at least two applications from use history,
wherein the iconization information is information indicating that the at least two applications have been used at a first time point, and
wherein the shortcut icon is set by assigning a name including information about the first time point to the shortcut icon.

9. The display electronic device of claim 7, further comprising a communication transceiver configured to transmit the set shortcut icon to another electronic device.

10. The electronic device of claim 7, wherein the shortcut icon is displayed as a composite image in which thumbnail images of each of the at least two applications are overlapped.

11. The electronic device of claim 7,
wherein the at least one processor is further configured to:
edit the shortcut icon according to an edit command, and
control the display to display of the edited shortcut icon.

12. An electronic device comprising:
a display;
a communication transceiver; and at least one processor configured to:
receive a shortcut icon from another electronic device, wherein the shortcut icon includes an object representing each of at least two applications,
control the display to display the received shortcut icon,
in response to receiving an input for selecting the shortcut icon, start simultaneous execution of each of the at least two applications
set the shortcut icon based on information related to each of the at least two applications, and
when the shortcut icon is selected, obtain window information corresponding to the shortcut icon and control the display to display the at least two user interfaces corresponding to the at least two applications based on the window information, wherein the information includes information regarding a number of times the at least two applications are executed simultaneously, wherein the shortcut icon is set based on information related to each of the at least two applications, wherein the shortcut icon is set when the number of times exceeds a threshold value, and wherein the window information further includes information about execution states of the applications.

13. The electronic device of claim 12, wherein the at least one processor is further configured to control execution of the at least two applications in the same execution states as the at least two applications executed in another device.

\* \* \* \* \*